US007821660B2

(12) United States Patent
Kitada

(10) Patent No.: US 7,821,660 B2
(45) Date of Patent: Oct. 26, 2010

(54) SYSTEM AND METHOD FOR COMPENSATING FOR RESOURCE UNAVAILABILITY IN AN IMAGE PROCESSING SYSTEM

(75) Inventor: Hiroshi Kitada, Tuckahoe, NY (US)

(73) Assignees: Ricoh Company, Ltd., Tokyo (JP); Ricoh Americas Corporation, West Caldwell, NJ (US)

(*) Notice: Subject to any disclaimer, the term of this patent is extended or adjusted under 35 U.S.C. 154(b) by 1329 days.

(21) Appl. No.: 11/092,829

(22) Filed: Mar. 30, 2005

(65) Prior Publication Data

US 2006/0227367 A1 Oct. 12, 2006

(51) Int. Cl.
*G06F 3/12* (2006.01)
*G06K 15/00* (2006.01)

(52) U.S. Cl. .................. 358/1.15; 358/1.13; 358/1.14
(58) Field of Classification Search .......... 358/1.1, 358/1.9, 1.11–1.18; 709/223
See application file for complete search history.

(56) References Cited

U.S. PATENT DOCUMENTS

| | | | |
|---|---|---|---|
| 5,323,393 A | 6/1994 | Barrett et al. | |
| 5,428,782 A | 6/1995 | White | |
| 5,666,490 A | 9/1997 | Gillings et al. | |
| 5,694,601 A | 12/1997 | White | |
| 5,793,964 A | 8/1998 | Rogers et al. | |
| 5,862,404 A | 1/1999 | Onaga | |
| 5,905,860 A * | 5/1999 | Olsen et al. | 726/27 |
| 6,009,442 A | 12/1999 | Chen et al. | |
| 6,020,973 A | 2/2000 | Levine et al. | |
| 6,023,722 A | 2/2000 | Colyer | |
| 6,119,137 A | 9/2000 | Smith et al. | |
| 6,125,372 A | 9/2000 | White | |
| 6,189,069 B1 | 2/2001 | Parkes et al. | |
| 6,209,048 B1 | 3/2001 | Wolff | |
| 6,219,718 B1 | 4/2001 | Villalpando | |
| 6,262,732 B1 | 7/2001 | Coleman et al. | |
| 6,327,045 B1 | 12/2001 | Teng et al. | |
| 6,330,611 B1 | 12/2001 | Itoh et al. | |
| 6,424,424 B1 | 7/2002 | Lomas et al. | |
| 6,434,343 B1 | 8/2002 | Kobayashi et al. | |
| 6,477,567 B1 | 11/2002 | Ohara | |
| 6,480,304 B1 | 11/2002 | Os et al. | |
| 6,496,206 B1 | 12/2002 | Mernyk et al. | |
| 6,567,121 B1 | 5/2003 | Kuno | |
| 6,578,067 B1 | 6/2003 | Okazaki et al. | |
| 6,694,376 B1 | 2/2004 | Ohara | |
| 6,738,841 B1 | 5/2004 | Wolff | |
| 6,785,023 B1 | 8/2004 | Iida | |
| 2002/0099707 A1 | 7/2002 | Matsumoto | |

(Continued)

FOREIGN PATENT DOCUMENTS

CA 2 439 846 A1 10/2002

(Continued)

*Primary Examiner*—Thierry L Pham
(74) *Attorney, Agent, or Firm*—Oblon, Spivak, McClelland, Maier & Neustadt, L.L.P.

(57) ABSTRACT

A method and system for providing back-up server functionality in an image processing system. Upon detecting that a primary server is unavailable an image processing device switches processing operations to a back-up server configured to receive information from the image processing device. The back-up server is configured to have substantially similar configuration and operate similarly to the primary server.

59 Claims, 22 Drawing Sheets

U.S. PATENT DOCUMENTS

| | | |
|---|---|---|
| 2002/0156834 A1 | 10/2002 | Kitada et al. |
| 2003/0135613 A1 | 7/2003 | Yoshida et al. |
| 2003/0154374 A1 | 8/2003 | Osada |
| 2003/0172093 A1 | 9/2003 | Nagoya |
| 2003/0217095 A1* | 11/2003 | Kitada et al. ............... 709/201 |
| 2005/0021608 A1 | 1/2005 | Wolff |
| 2006/0155773 A1* | 7/2006 | Drouet et al. ............... 707/200 |

FOREIGN PATENT DOCUMENTS

| | | |
|---|---|---|
| EP | 1 061 711 A2 | 12/2000 |
| EP | 1061711 A2 * | 12/2000 |
| EP | 1 255 205 A1 | 11/2002 |
| EP | 1 376 361 A1 | 1/2004 |
| JP | 2000-357160 | 12/2000 |
| JP | 2002-287999 | 10/2002 |
| JP | 2002-366412 | 12/2002 |
| JP | 2003-233544 | 8/2003 |
| JP | 2003-256303 | 9/2003 |
| JP | 2004-139347 | 5/2004 |
| JP | 2004-171571 | 6/2004 |
| JP | 2004310516 A * | 11/2004 |
| WO | WO 02/077818 A1 | 10/2002 |

* cited by examiner

Fig. 4

```xml
<root>
    <error_code>0</error_code>
    <error_description />
    <Profile_ID>p_F7</Profile_ID>
    <BaseDN>o=rcus</BaseDN>
    <NT_Authentication>0</NT_Authentication>
    <LDAP_Enabled>-1</LDAP_Enabled>
    <Time_Out>60</Time_Out>
    <Max_Result_Count>0</Max_Result_Count>

<Plug_ins>
    <Plug_in>
        <Plug_in_name>RightFax</Plug-_in_name>
        <Login_required>1</Login_equired>
        <Integrated_Login>1</Integrated_Login>
        <Login_URL>login_RightFax.asp</Login_URL>
    </Plug_in>
    <Plug_in>
        <Plug_in_name>Documentum</Plug-_in_name>
        <Login_required>1</Login_equired>
        <Integrated_Login>0</Integrated_Login>
        <Login_URL>login_Documentum.asp</Login_URL>
    </Plug_in>
    <Plug_in>
        <Plug_in_name>Stellent</Plug-_in_name>
        <Login_required>0</Login_equired>
        <Integrated_Login>0</Integrated_Login>
        <Login_URL> </Login_URL>
    </Plug_in>
    </Plug_ins>

</root>
```

Plug-in_name: Name of plug-in
Login_required: Indicates if login is required, 1 - login required, 0 - login not required.
Integrated_Login: Indicates if separate login is required for this plug-in, 1 - no separate login, 0 - separate login.
Login_URL: If <Integrate_Login> = 0, specify URL used for separate login.

SYSTEM AND METHOD FOR COMPENSATING FOR RESOURCE UNAVAILABILITY IN AN IMAGE PROCESSING SYSTEM

BACKGROUND OF THE INVENTION

1. Field of the Invention

The present invention is directed to methods and systems for providing back-up server functionality in an image processing system.

2. Discussion of Background

Over the past several years, there has been an increase in the number and types of document-related applications available over networks. These applications can include document management systems, such as those specializing in managing documents of various specific contents, for example medical, legal, financial, marketing, scientific, educational, etc. Other applications include various delivery systems, such as e-mail servers, facsimile servers, and/or regular mail delivery. Yet other applications include document processing systems, such as format conversion and optical character recognition. Further applications include document management systems used to store, organize, and manage various documents. These document management systems used to store, organize, and manage various documents may be referred to as "backend" applications.

Various systems for accessing these network applications from image processing devices (e.g., scanners, printers, copy machines, cameras) have been contemplated. One system associates a computer with each image processing device for managing the documents with the network applications. The computers communicate with the various network applications to enable the use of these applications by the user of the image processing devices. For example, the computers request and receive from the network applications information about the format and content of the data required by the applications to manage documents. The computers process this information and configure the image processing devices to provide the correct format and content.

Such systems, however, have numerous drawbacks, especially if considered within an environment of a relatively large office with significant numbers of image processing devices using different kinds of network document applications, which may change over time. Specifically, the requirement of having a computer for each image processing device increases cost and decreases flexibility. This requirement creates the burden of maintaining, securing and upgrading the computers. When new applications are integrated within the system, each computer and/or each image processing device should be updated and made compatible with the new network application. The task of updating each local computer and/or each image processing device creates a costly burden on the administrator of the system, and severely increases the traffic over the company's network. This increase in traffic can slow down the company's entire network.

In light of the above-mentioned shortcomings, other systems have been contemplated which include a computer, or server, connected to a plurality of image processing devices. These servers act as an agent, or gateway, allowing the image processing device to communicate and send processed image data to the network applications. For example, the servers may be capable of requesting and receiving information from the network applications about the format and content of the data required by the applications to manage documents. The server then formats information received from each of the plurality of image processing devices before forwarding this information onto the network applications.

However, a drawback of current systems is that there is no failure recovery or back-up procedure should the computer, or server, used in the system become unavailable. Therefore, when the computer or server is inaccessible from the image processing devices, the image processing devices are unable to utilize any of the services provided by the server.

In the case when only a single computer is responsible for handling the transactions between the image processing device and the network applications and that computer becomes unavailable, the image processing device becomes unable to send documents or files generated by the image processing device to any of the network applications for which the computer served as a conduit. Further, the image processing device may be unavailable until the computer is repaired or replaced which may take an extended period of time. Also, providing a backup computer for each image processing device could prove to be very cost prohibitive, since each image processing device would require a plurality of computers in order to compensate for a failure of the primary computer.

In the case when a single server is responsible for interfacing with a plurality of image processing devices, a failure of the server could cause many image processing devices to become unavailable. Such a failure could cause all the image processing devices in a department or a business, which are connected to the same server, to all become unavailable to communicate over the network. For example, if a single server is responsible for interfacing with an entire department's allocation of image processing devices, the failure of that server precludes the entire group of servers from accessing the services provided by the server.

SUMMARY OF THE INVENTION

The present inventor has determined that there is a need for more reliable system and method for providing back-up server functionality to the image processing device by providing a plurality of server devices.

The present invention includes at least one image processing device, such as a multi-function device, but preferably several image processing devices, a primary document manager server connected to the image processing devices, a secondary document manager server connected to the image processing device and network applications connected to the primary and secondary document manager servers. The primary and secondary document manager servers are both capable of functioning as an agent for the image processing devices and as a gateway to the network applications.

In one embodiment, when the image processing device is activated, specific identification information is sent from the image processing device to a primary document manager server. Typically, information which is submitted includes device identification or user authentication information, but may include any other identifying information related to the image processing device or the user of the image processing device. Once the image processing device transmits this information to the primary document manager server the image processing device determines whether the primary document manager server is unavailable based on a response, or lack thereof, from the primary document manager server. The primary document manager server may be unavailable for a plurality of reasons, as will be discussed below. Should the image processing device determine that the primary document manager server is unavailable, it transmits the identification information to a secondary document manager server identified by specific information stored in the image processing device, typically an internet protocol (IP) address.

In another embodiment of the present invention, a user session is initiated from the image processing device with the primary document manager server. A user session may be initiated, or active, once a user logs onto or is authenticated, or after the image processing device has been registered with the primary document manager server. After the user session is initiated, the image processing device attempts to contact the primary document manager server to fulfill a request. If the image processing device determines that the primary document manager server is unavailable, the image processing device contacts the secondary document manager server in order to process the request. If the secondary document manager server is available, the user, or device logs in or registers with the secondary document manager before the secondary document manager responds to a request from the image processing device.

In another embodiment of the present invention the user has initiated a procedure of uploading image data, or other data processed by the image processing device, from the image processing device to the primary document manager server. In this instance, the image processing device contacts a primary document manager server to upload the data, and determines that the primary document manager server is unavailable. In response, the image processing device contacts the secondary document manager server in order to start upload of the data. If the secondary document manager server is available, uploading of the data commences and the secondary document manager server is then set as the primary document manager server. Since the user is already be authenticated to get to the point of uploading data, no additional login, registration or authentication is required by the user or the device.

In another embodiment of the present invention the primary document manager server and the secondary document manager server participate in an exchange of configuration data to maintain synchronization between the servers. The secondary document manager server, on a periodic basis, transmits a request for configuration data to the primary document manager server. In response, the primary document manager server transmits the updated configuration data to the secondary document manager server which then updates its configuration data in response. Then, after a predetermined period of time expires, the secondary document manager server sends a subsequent request to the primary document manager server requesting updated configuration data.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 4 shows exemplary code of a plug-in associated with a back end application according to one embodiment of the present invention;

DETAILED DESCRIPTION OF THE PREFERRED EMBODIMENTS

Figure 1:
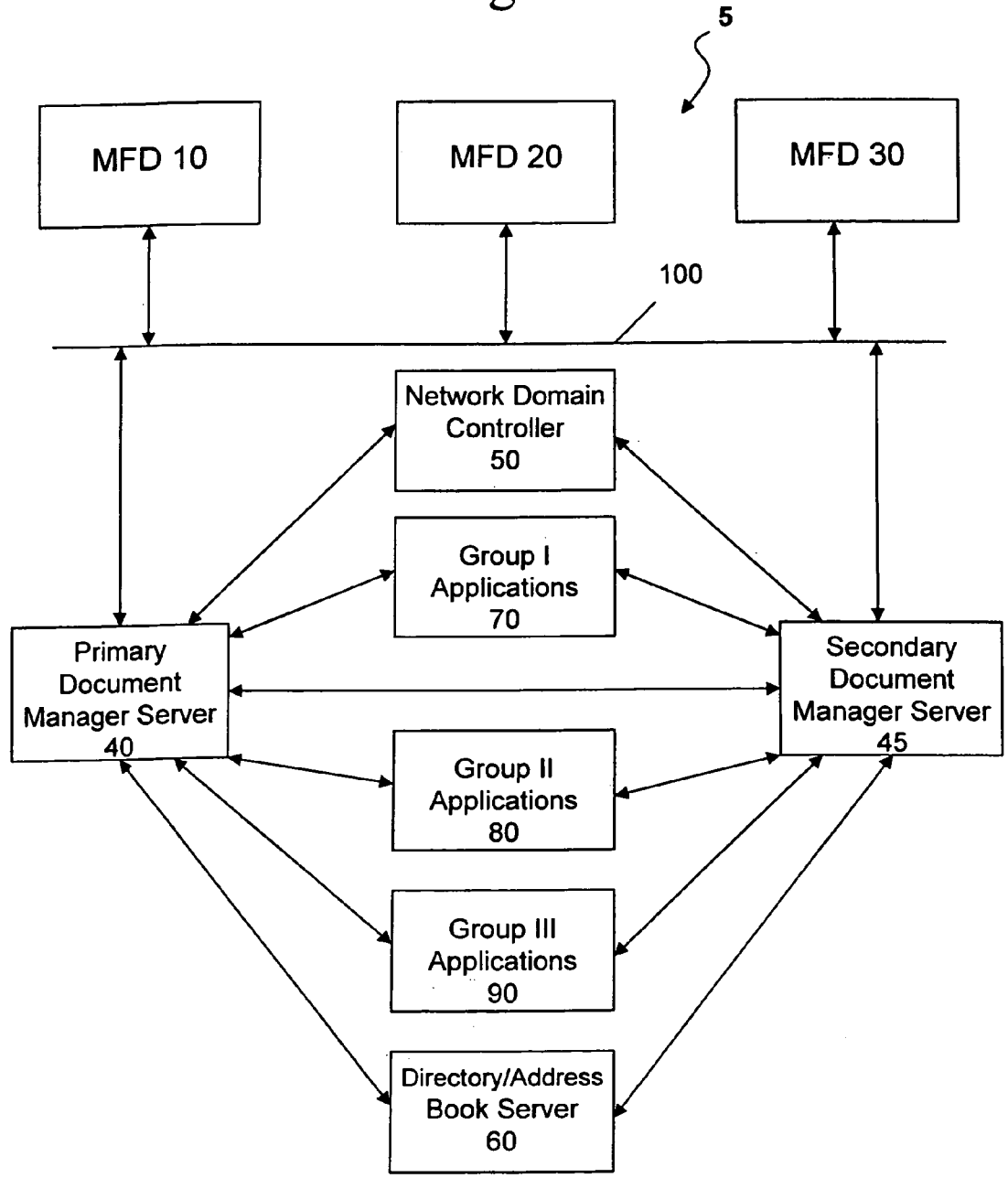
FIG. 1 is a block diagram showing an overall system configuration according to one embodiment of the present invention.

Referring now to the drawings, wherein like reference numerals designate identical or corresponding parts throughout the several views, FIG. 1 is a block diagram of a system 5 for managing documents according to the present invention. In the system 5, a primary document manager server 40 and a secondary document manager server 45 manage documents and files by processing information related to applications, which can be grouped in different groups I-III. Primary document manger server 40 (or "primary server") and secondary document manager server 45 (or "secondary server") have the same configuration data, hardware and functional capabilities with the exception of licensing information, which is stored only in primary server 40. Alternatively, the capabilities and configuration may be different, if desired. For example, the backup or secondary server may be an older and less powerful server. Therefore, throughout the specification the primary server 40 and the secondary server 45, may be referred to collectively as "document manager servers" when the description is applicable to both the primary server 40 and the secondary server 45. It should also be noted that while the document manager servers 40 and 45 may be discussed together, only one server is typically providing services at any one point in time. Since the document manager servers 40 and 45 may have substantially the same configuration and functional capabilities, the designation of "primary" and "secondary" are used to differentiate the role of each server in particular processes described herein. The purpose and effect of such a differentiation will be described in greater detail below. The document manager servers 40 and 45 are also connected to facilitate the exchange and synchronization of configuration data, as will be described in FIG. 12. The structure and operation of the document manager servers 40 and 45 are described in greater detail below with corresponding FIGS. 15-16.

The system 5 includes a network 100 that interconnects at least one, but preferably a plurality of image processing devices which may be implemented as multifunction devices (MFDs) 10-30, to document manager servers 40 and 45. The network 100 preferably uses TCP/IP (Transmission Control Protocol/Internet Protocol), but any other desirable network protocol such as, for example IPX/SPX (Internetwork Packet Exchange/Sequential Packet Exchange), NetBEUI (NetBIOS Extended User Interface), or NetBIOS (Network Basic Input/Output System) is possible. The network 100 can be a local area network, a wide area network, any type of network such as an intranet, an extranet, the Internet or a combination thereof. Other communications links for the network 100, such as a virtual private network, or a wireless link, or any other suitable substitute may be used as well.

As shown in FIG. 1, the devices 10-30 can be multi-function devices, or "MFDs" and may also be referred to as image processing devices. An MFD may incorporate or be any one of a plurality of a scanner, a copy machine, a printer, a fax machine, a digital camera, other office devices, and combinations thereof. Any one or combinations of these devices are referred to as a MFD, generally. Various types of MFDs are commonly known in the art and share common features and hardware with the MFDs of the present invention. In one embodiment of the present invention, the MFD is a portable device, such as a digital camera, connectable to the Internet via a wired or wireless connection. Such an MFD combines digital imaging and internet capabilities so that one can capture still images, sounds or videos and share such multimedia using wired or wireless connections from various locations. The MFD can create web pages, send and receive e-mails with attachments, edit images, FTP files, surf the Internet, and send or receive a fax. In another embodiment, the MFD is one of a combination of a scanner, photocopier and printer, as described in more detail below with corresponding FIGS. 13-14.

As shown in FIG. 1, the document manager servers 40 and 45 are connected to a directory/address book server 60 (or "directory server" or "global directory"). The directory server 60 can include information such as the names, addresses, network addresses, e-mail addresses, phone/fax numbers, other types of destination information, and authorization of individuals. Other information can also be included in the directory server 60. Examples of directory servers 60 compatible with the present invention include, but are not limited to, Lotus Notes™, Microsoft Exchange™, and LDAP ("Lightweight Directory Access Protocol") enabled directory servers. LDAP is a software protocol that enables a user to perform network authentication, locate organizations, individuals, files, devices in a network. The document manager servers 40 and 45 can also be connected to a network domain controller 50 that controls authentication of the MFD user. The directory server is configured to receive user information entered at the authentication device or image processing device and authenticate the user for the network.

The network domain controller 50 is, for example, a server that responds to security authentication requests, such as logging in, within its domain. The network domain controller 50 may be backed up by one or more backup network domain controllers that can optionally also process security authentication. Examples of a directory server 60 and a network domain controller 50 are disclosed in U.S. application Ser. No. 10/243,645, filed Sep. 16, 2002, the entire content of which is hereby incorporated by reference.

Briefly, the system 5 optionally provides access for the users of the MFDs 10-30 to the information stored at the directory server 60 via the document manager servers 40 and 45. The system 5 also allows for users, who are authenticated at the image processing device, to transmit a digital signature or other user specific identification information to the directory server 60. The identification information may be retrieved from an authentication information device, such as a smartcard or any similar device configured to store user identification information or input by a user via a user interface of the MFD.

The directory server 60 may then retrieve preference information based on the user identification information and transmit the preference information to the MFDs 10-30. This preference information may include information relating to scan settings, such as resolution, density, scan mode, color, paper size, file format, or any additional settings that can be adjusted at the MFD. The preference information may also include information relating to the network application which is the destination of the processed image, including a specific e-mail address, a backend system, a middle processing system, or any other network application configured to accept the processed data. A middle processing system may include a file formation conversion system, optical character recognition, or any similarly suited system as will be described in greater detail below. Also, the preference information may include a software plug-in, which will be discussed in greater detail below, or any other information related to changing the functionality of the MFD. After receiving this information, the MFD processes the preference information and makes changes corresponding to the preference data before the user processes an image.

A user can also request a search of the company's global directory stored at the directory server 60. The document manager servers 40 and 45 can pass the search request to the directory server 60 and can receive the search results (e.g., e-mail addresses and/or fax numbers) from the directory server 60. The document-manager servers 40 and 45 can then pass the search results to the MFD 20, which can temporarily store and display them. The user can select a displayed result (e.g., an e-mail addresses or a fax number), scan a document, and request that the scanned document be transmitted, e-mailed and/or faxed to the selected destination.

The document manager servers 40 and 45 can be configured to act as an intermediate agent, or a gateway between a plurality of network applications 50, 60, 70, 80, and 90 and the MFDs. The applications 70, 80, and 90 can include for example an e-mail server, a fax server, a file format conversion system, an optical character recognition (OCR) system, a document management system and a file storage system or any combination of multiples thereof. The document management servers 40 and 45 are capable of supporting a plurality of backend systems such as various document management systems, or file storage systems. In a preferred embodiment, the e-mail server is incorporated into the document manager servers 40 and 45. The e-mail server can include, but is not limited to, Lotus Notes™ e-mail server, Microsoft Exchange™ e-mail server, and SMTP ("Simple Mail Transfer Protocol") e-mail servers. In a preferred embodiment, the fax server is the Captaris' RightFax™ server. However, other suitable fax servers may be implemented in accordance with the present invention. The file format conversion system can be configured to convert a document from one format (e.g., TIFF, "Tag Image File Format") to another (e.g., PDF, "Portable Document Format"). An example of a document management system is disclosed in U.S. application Ser. No. 09/795,438, filed Mar. 1, 2001; and in U.S. application Ser. No. 10/116,162, filed Apr. 5, 2002, the entire contents of which are hereby incorporated by reference. Other document management systems include systems that specialize in managing documents having a specific content. As an example, the document management systems could be the system implemented by the Centers for Medicare & Medicaid Services for managing medical and insurance records as provided under the Health Insurance Portability and Accountability Act (HIPAA). Documentum is an exemplary brand of a digital file management system used to manage, store and perform other various file management operations on stored document/record/multimedia files. Other systems for managing and/or storing documents, such as legal, financial, marketing, scientific, educational, can be connected to the document manager servers 40 and 45.

As stated above, the document management servers 40 and 45 are capable of supporting a plurality of such systems simultaneously. As will be described later, a profile can be configured to support multiple systems via software plug-ins, and a user interface of the image processing devices 10, 20, 30 can be customized based on the received software plug-ins.

These applications can be grouped, for example in Groups I-III. Group I can be a delivery system group including an e-mail server and a fax server; Group II can be a middle processing group including a file format conversion system and an optical character recognition system; and Group III can be a backend system group including a document management system and a file storage system. Groups I-III can include a plurality of devices from each category. For example, the document management servers 40 and 45 can be connected to a plurality of applications from each group. The document manager servers 40 and 45 can direct documents to several applications within each group. In a preferred embodiment, one of the document manager servers 40 or 45 delivers a document to several of the applications within the delivery system group, but delivers the document to one or a plurality of the application within the middle processing group and to one or a plurality of the applications of the backend system group. For example, one of the document manager server 40 or 45 can deliver a document to the e-mail and fax servers, to the OCR system, and to a document management system. Other combinations are possible in other embodiments.

In a preferred embodiment, the MFDs 10-30 and the document manager servers 40 and 45 exchange data using the protocol HTTP ("Hypertext Transfer Protocol") or HTTPS (HTTP over Secure Socket Layer) over the network 100. Other protocols such as TCP/IP, IPX/SPX, NetBEUI, or NetBIOS, for example can equivalently be used with the present invention. Preferably, the MFDs 10-30 and the document manager servers 40 and 45 exchange data using the format XML ("Extensible Markup Language"). Other formats, such as, but not limited to, HTML, can equivalently be used with the present invention.

In one embodiment, the document manager servers 40 and 45 can include an MFD profiler 280 (shown in FIG. 2) that manages profiles for the MFDs 10-30. The administrator of the system 5 can create, change and maintain the profiles via a profile user interface for the document manager servers 40 and 45. A profile includes information (e.g., parameters) sent from the document manager servers 40 and 45 to an MFD. Based on this information, the MFD can adjust its user interface and functions so as to properly interface with the document manager servers 40 and 45. The information may also include software plug-ins processed by the MFD to allow the operation of the MFD to be modified based on the existence or introduction of a backend system. The software plug-ins typically correspond to each of the backend application connected to the document manager servers 40 and 45, but may also be used to change other functions of the MFD not related to a backend application. For example, the MFD can display selections allowing a user to select options (e.g., a particular delivery system, a middle processing system, or a backend system) available to the MFD via the document manager servers 40 and 45. Information included in the profile can be the identity of the various applications 70-90 connected to the document manager servers 40 and 45. The profiler 280 receives identification information from an MFD (e.g., the serial number, MAC address, IP address, etc.) and uses this identification information to check whether the MFD is registered within a register, e.g., a data table stored in a memory of the document manager servers 40 and 45. If registered, the profiler sends the MFD a profile assigned to the MFD. If the MFD is not registered, the profiler can register the MFD and send the MFD a profile. The profiler can store more than one profile. In a preferred embodiment, one profile is assigned to each MFD, and more than one MFD can share the same profile. While the term "software plug-in" has been used, any type of software, programming, or chip can be used to modify the operation of the MFD.

Examples of parameters in a profile include, but are not limited to:

a profile ID, which identifies the profile;

an LDAP Enabled parameter, which indicates whether or not the LDAP tree search is enabled on the document manager servers 40 and 45 using the directory server 60;

a Base Domain Name (DN) parameter, which provides a default field of search for the LDAP tree when the LDAP search is enabled;

a Network Authentication parameter, which indicates whether or not network authentication is enabled using the network domain controller 50;

a Time-Out parameter, which indicates the time period that should elapse before the MFD resets and requires the user to enter login information;

a Max Result Count parameter, which determines the maximum number of LDAP query results returned;

a Fax Option parameter, which indicates whether or not a fax server is connected to the document manager servers 40 and 45;

a Post Scan Processing parameter, which indicates what post scan processing system is connected to the document manager servers 40 and 45, post scan processing systems may include, for example an e-mail server, a file format conversion system, an optical character recognition system, etc.;

a Backend parameter, indicating which backend systems are connected to the document manager servers 40 and 45 and are able to be accessed by the MFD, such backend systems may include, a document management system or a file storage system, or another similar type of system; and a Software Plug-in, exemplary code for which is depicted in FIG. 4, which contains and executable file allowing the image processing device to perform specific processing tasks related to a backend application.

Other parameters may also be included in the profile. For example, parameters reflecting specific user ID, default size of papers, scanning resolution setting, condition of the document feeder, department code for billing image processing operations, additional scanning job parameters for the specific user ID, or any additional parameters may be used.

The Backend parameter might also indicate if a user is required to subsequently login to the backend system after the user has already logged into the network. Further, the Backend parameter may also initiate an authentication step to determine if a user has already logged into the network and been automatically authenticated to operate the back-end system based on the network authentication. If the Backend parameter indicates that a software plug-in is required for the MFD device to properly interface with the backend application, then the MFD transmits data to the currently active document manager server 40 or 45 requesting the receipt of a software plug-in.

Figure 2:
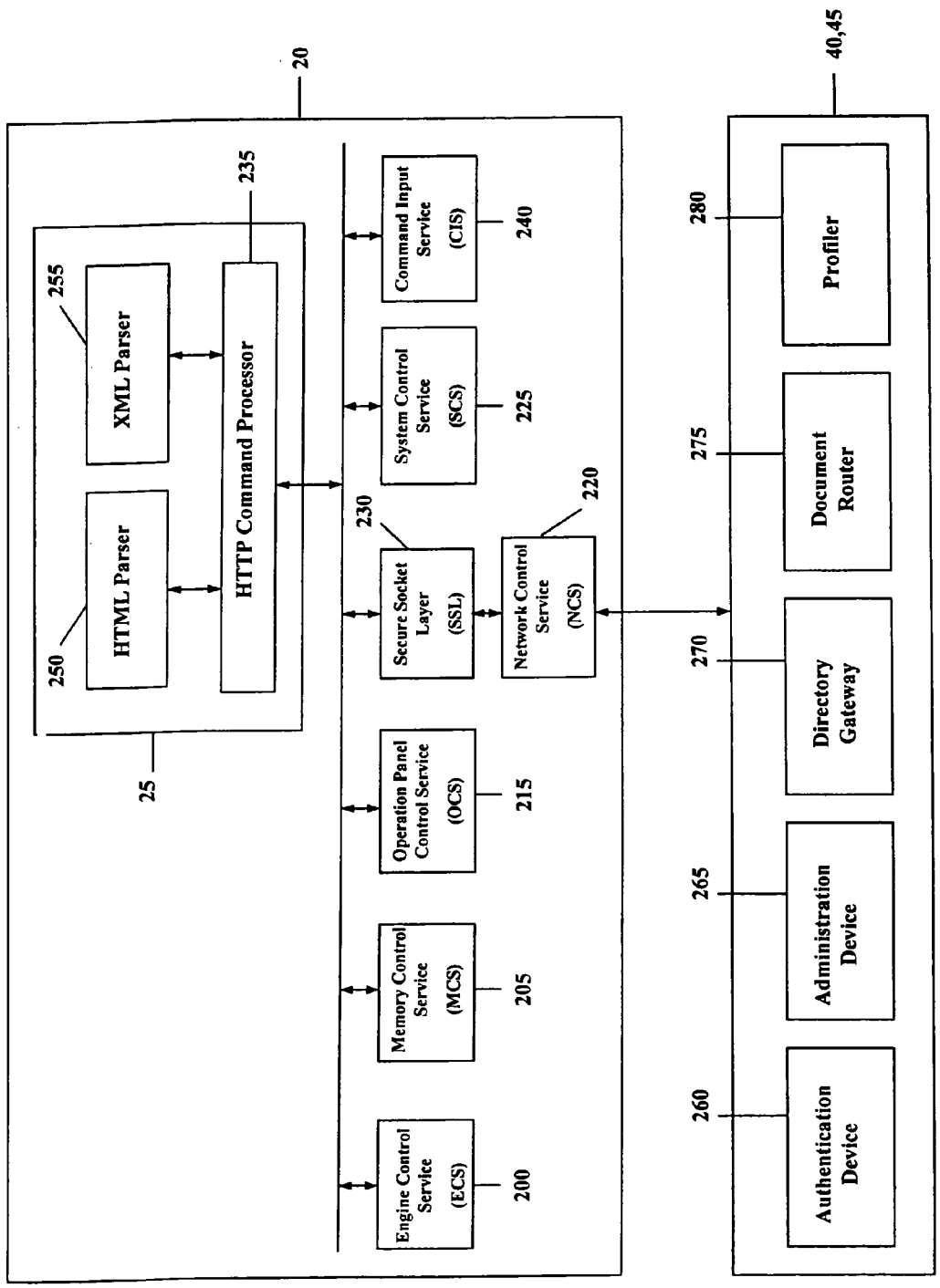
FIG. 2 is a block diagram illustrating components of the image processing device and document manager server according to one embodiment of the present invention.

FIG. 2 illustrates an MFD 20's browser 25 configured to exchange information between the MFD 20 and the document manager servers 40 and 45 according to one embodiment of the present invention. An example of a browser 25 is disclosed in U.S. application Ser. No. 10/243,643, filed Sep. 16, 2002, the entire content of which is incorporated by reference. Further details of the browser 25 are set forth below. FIG. 2 shows the software components of the document manager servers 40 and 45, which include an authentication device 260 configured to perform the authentication functions discussed above. The document manager servers 40 and 45 also include an administration device 265 which allows the system administrator to administer the system 5. It should be noted that only the primary server 40 is able to be accessed to have configuration data modified. The secondary server 45 includes an administration device 265 allowing configuration data to be modified, however the configuration data is not able t be modified unless the secondary server 45 is designated as the primary server in the system. The administrator of the system can access the profiler 280 via the administration device 265 to set user profiles and/or the MFD profiles for the MFDs 10-30 connected to the document manager servers 40 and 45. A directory gateway 270 is also included within the document manager servers 40 and 45 and is configured to communicate with the directory server 60. The document manager servers 40 and 45 also include a document router 275 configured to route the documents received from the MFDs to the appropriate applications 70, 80 and 90.

As shown in FIG. 2, the MFD 20 includes an engine control service (ECS) 200 that controls, for example, the scanning engine of the MFD 20. A memory control service (MCS) 205 controls access to the memory of the MFD 20. An operation panel control service (OCS) 215 generates outputs which are displayed on the touch-panel type liquid crystal display (LCD) of the MFD 20. It should be noted that the display and user interface of the MFD 20 is not limited to an LCD display, but may also be any other suitable device, or combination of devices, such as but not limited to LCDs, light-emitting diode (LED) displays, cathode ray tube (CRT) displays, plasma displays, keypads, and/or keyboards. The OCS 215 can generate, for example, conventional menus for MFD operation. A system control service (SCS) 225 controls and/or monitors sensors within the MFD 20. For example, the SCS 225 controls the touch screen sensors, paper jam sensors and scanning operation sensors. Accordingly, the SCS 225 can manage the status of the MFD 20 based on the information from the sensors. A network control service (NCS) 220 controls communication between the browser 25 and the document manager servers 40 and 45. Optionally, a secure socket layer (SSL) 230, in the form of a communication formatting device or routine, provides added security for communications between the NCS 220 and the browser 25. A command input service (CIS) 240 processes input information, for example, from the LCD touch panel and/or a keypad of the MFD 20. A user of the MFD can enter information and commands using the LCD touch panel and the keypad. The CIS 240 can process such information and commands entered by a user (e.g., forwarded to the CIS 240 by the SCS 225). The CIS 240 can generate a command (e.g., a display command) based on such processing and transmit the command to other components of the MFD (e.g., to the OCS 215 to display a graphic on the LCD). The CIS 240 can also exchange information and commands with the NCS 220 for processing with the browser 25 in connection with the document manager servers 40 and 45.

Conventional MFDs include ECSs, MCSs, OCSs, NCSs, SCSs, and CISs which are firmware for implementing and controlling each hardware component of the MFD. In the present invention, however, the NCS 220 is configured to communicate with the browser 25. For instance, the NCS 220 has additional capabilities for communicating using the HTTP protocol. The NCS 220 is also configured to communicate with the document manager servers 40 and 45 so that the NCS 220 exchanges data between the browser 25 and the document manager servers 40 and 45. For example, the NCS 220 can transmit to the document manager servers 40 and 45 identification information and receive a profile, can transmit a request for an e-mail address and can receive from the document manager servers 40 and 45 a selected e-mail address, or the NCS 220 can transmit to the document manager servers 40 and 45 login information and can receive a user authentication confirmation from the document manager servers 40 and 45 (and from the directory server 60) during an authentication process. The NCS 220 is also capable of receiving plug-in information from the document manager servers 40 and 45 for initiating the authentication procedure described above or altering the user interface of the MFD.

The browser 25 includes an HTTP command processor 235 that communicates with the network control service (NCS) 220 of the MFD 20. For example, a request for an e-mail address entered by the user via the MFD keypad, or a request for displaying information on the LCD can be passed from the NCS 220 to the browser 25 by the HTTP command processor 235. The HTTP command processor 235 can exchange data in the HTML format with the browser's HTML parser 250, and can exchange data in the XML format with the XML parser 255. The parsers 250 and 255 can check the data from the HTTP command processor 235 for syntax and process the data for HTTP command processor 235. The present invention can include conventional parsers, which are conventionally included as part of a compiler.

The HTTP command processor 235 can be provided with a program code, or software plug-in, for implementing a specific application, such as user authentication processing which can be implemented with the directory service of the document manager servers 40 and 45. The HTTP command processor 235 can process information based on definitions of the specific application. For example, the HTTP command processor 235 can process information provided by the user, such as User Name or Password, and generate an HTTP request based on this processing for the document manager servers 40 and 45. The HTTP command processor 235 can transmit this HTTP request to the NCS 220 to be transmitted to the document manager servers 40 and 45. The HTTP command processor 235 can also receive plug-in information relating to specific backend system functionalities. These plug-ins allow for users to add processing instructions, metadata, and other indexing information to the processed image file transmitted from the MFD to the document manager servers 40 and 45.

The HTTP command processor 235 can also process information received from the document manager servers 40 and 45 (via the NCS 220). For example, the HTTP command processor 235 can receive an HTTP response generated by the document manager servers 40 and 45 which includes a profile with parameters or software plug-ins for operating the MFD. The HTTP command processor 235 can process this information and generate commands to control the MFD in accordance with the information, e.g., can request the MFD to display a menu with the appropriate buttons, or to scan according to the scanning job parameters for the specific user ID. As another example, the HTTP command processor 235 can generate a graphic drawing command for the LCD panel. The HTTP command processor 235 can transmit the commands to the appropriate MFD firmware (e.g., the OCS 215) to be executed. For example, the OCS 215 can receive the graphic drawing command and execute it by displaying a graphic on the LCD panel.

FIGS. 3A-3B, 5A-5B, 6A-6B, 7A-7C, 8, 9A-9B, 10A-10B, 11, and 12 are flowcharts depicting steps performed in providing back-up server-functionality and managing documents using either the primary server 40 or secondary server 45 according to various embodiments of the present invention.

Figure 3A:
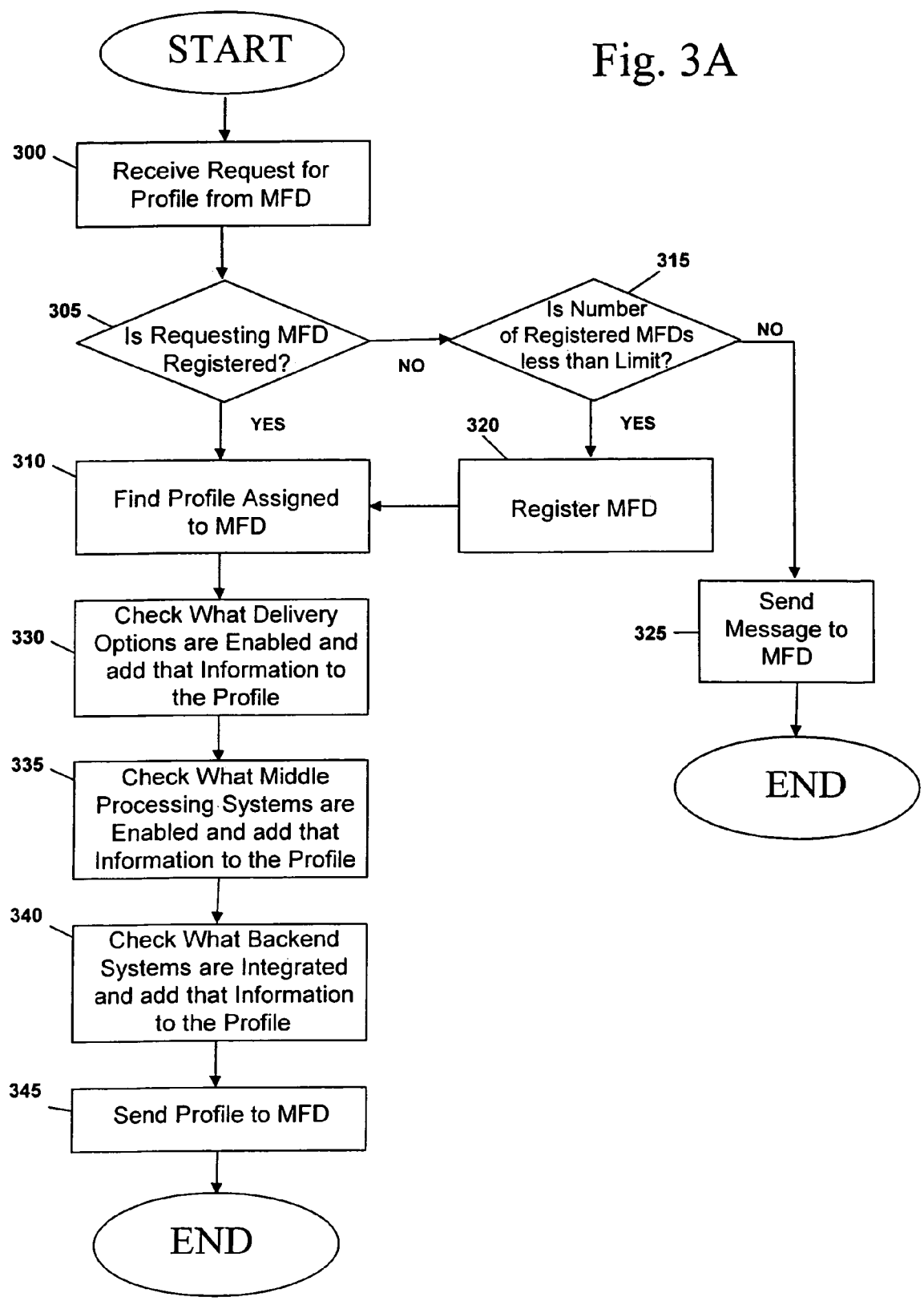
FIG. 3A is a flowchart illustrating the steps by which a multi-function device obtains profile information according to one embodiment of the present invention.

The process shown in FIG. 3A shows a service initiation process performed between the primary server 40 or secondary server 45 and the MFD. It should be noted that this process is described in reference to a plurality of document manager servers, however at any given time only one document manager server is communicating with the MFD. By default the MFD stores IP addresses, or other suitable identification information, relating to the identity of the primary server 40 and the secondary server 45. Each time the MFD is required to access one of the document manager servers 40 or 45, the MDF, by default, contacts the primary server 40 first. Also, each time the MFD communicates with one of the active server 40 or 45, the server returns IP addresses for both the primary server and the secondary server so that the MFD stores updated communication information for the primary and secondary servers. The process of providing back-up server functionality during the service initiation process will be described in greater detail with reference to FIGS. 6A and 6B. The process described below in FIGS. 3A and 3B relates to an initiation procedure that takes place between the MFD and the primary server 40 or secondary server 45 in the case that the primary server 40 is determined by the MFD to be unavailable. For purposes of the descriptions below the term "active server" will be used to generically refer to the document manger server 40 or 45 which is currently active on the system.

At step 300, the active server 40 or 45 receives a request for a profile from an image processing device or MFD. This request can include identification information identifying the requesting MFD. The identification information can include the serial number of the MFD and/or group identification for the MFD, or other identification information. A group identification can be for example an indication that the MFD belongs to a specific division with an organization, the group having a specific function, for example legal, accounting, marketing, or having a specific location, for example a floor, a building, a town, a state, a country, or having a specific security level, etc. Alternatively, the identification information can allow the active server 40 or 45 to look up further identification information, such as the division, group, or any other additional information, as specified above.

At step 305, the active server 40 or 45 inquires whether the MFD is registered, for example by looking up the identification information in a register that stores registered MFDs. If the MFD is registered, the active server 40 or 45 finds a profile assigned to the MFD at step 310. If the MFD is not registered, the active server 40 or 45 can compare, at step 315, the number of registered MFDs with a predetermined number. This predetermined number can be for example the maximum number of devices licensed to use a particular application connected to the active server 40 or 45. It should be noted that at any one time only one of the document servers 40 or 45 can contain activated licensing information regarding the number of MFDs capable of operating with the active server 40 or 45. As will be discussed later in more detail, this licensing information may be activated in either server depending on the operational status of the document manager servers 40 and 45. However, licensing information should be activated in the secondary server 45 before it is designated as a primary server. This predetermined number (and information identifying its associated application) is stored at the primary document manager server, and can be for example, 5, 25, 100, or any desired number, depending on the license agreement between the network application and the organization benefiting from the MFDs. License information can also be included in MFD profiles so that the MFD can change its user interface and functions accordingly. If the number of registered image processing devices is less than the predetermined number, the active server 40 or 45 can register the MFD at step 320 and find a profile assigned to the MFD at step 310. If the number of registered image processing devices is equal to the predetermined limit, the active server 40 or 45 can transmit an error message to the MFD at step 325 indicating that services are not available to the MFD-because the maximum number of licensed MFDs is reached.

At step 330, the active server 40 or 45 determines the delivery options, e.g., fax server, e-mail server, which are available and adds this information to the profile. At step 335, the active server 40 or 45 determines which middle processing systems are available and adds this information to the profile. At step 340, the active server 40 or 45 ascertains the available backend systems and adds this information to the profile. This step optionally includes the attachment of a plug-in allowing the MFD to implement customized functions which allow it to operate with specific backend systems. At step 345, the active server 40 or 45 sends the profile and any plug-ins to the registered MFD.

The active server 40 or 45 can repeat the above steps for several MFDs. If the MFDs belong to the same group within an organization, the active server 40 or 45 may optionally transmit the same profile to each of the image processing devices. After the MFD has received its profile from the active server 40 or 45, the MFD can create an initial display user interface based on the various parameters provided in the profile and corresponding plug-ins, as discussed in reference to FIG. 4B.

Figure 3B:
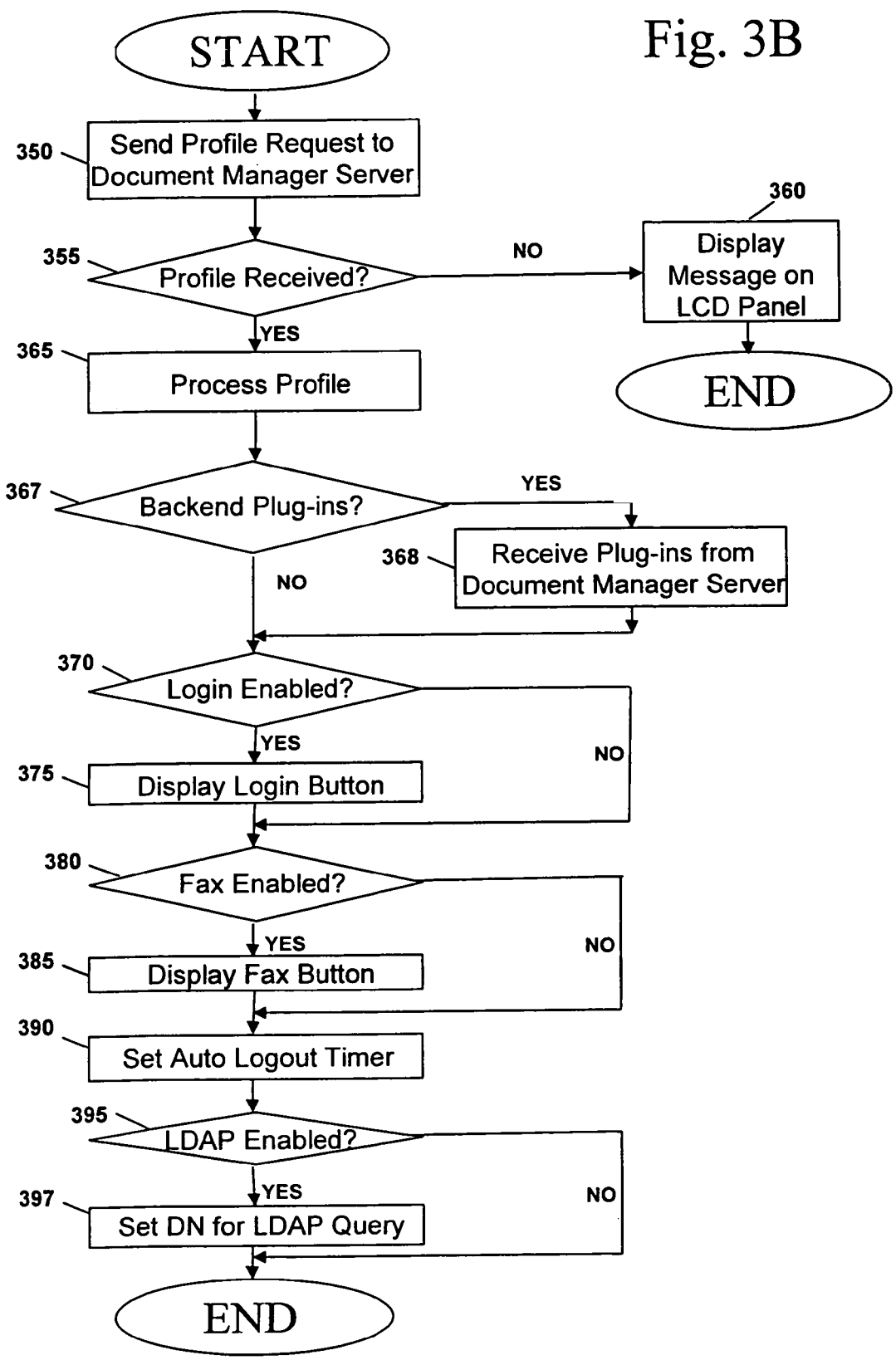
FIG. 3B is a flowchart illustrating the steps performed by the multi-function device upon receipt of the profile information according to one embodiment of the present invention.

The process shown in FIG. 3B shows a method performed by an image processing device, e.g., an MFD, and can start, for example, when the image processing device is turned on or activated by a user. At step 350, the MFD sends a request for a profile to the active server 40 or 45. As noted above, this request can include identification, such as the serial number of the image processing device. At step 355, the MFD inquires whether the profile has been received from the active server 40 or 45. If no profile has been received but instead an error message was received from the active server 40 or 45, the MFD displays an error message at step 360. If the profile is received, the MFD processes the profile received at step 365. Then at step 367 the MFD determines if backend application requiring software plug-ins are enabled by the received profile. If software plug-ins are required, at step 368 the MFD transmits a message to the active server 40 or 45 which transmits the required plug-in to the MFD. The plug-ins can be used by the MFD to assist in creating or customizing a user interface for interfacing with the available backend systems. It should be noted that the software plug-in may also be received in coordination, or simultaneously, with the profile information or at any other time. As part of this processing, the MFD can generate displays as a function of the profile parameters. For example, the MFD can generate specific menus or user interfaces based on the backend and middle processing systems identified in the profile. These user interfaces or menus may be generated from additional plug-in information corresponding to the backend and middle processing systems received at the MFD from the document manager server. This step of customizing the user interface based on received profile and plug-in information prevents the MFD from presenting a user interface, or menu option, to a user corresponding to a backend or middle processing system for which the user or MFD is not permitted access. At step 365, the MFD can also display graphics on its LCD based on default settings.

The parameters provided in the profile can correspond to functions that are optional for the MFD. Other functions are enabled by default within the MFD so that the MFD displays graphics corresponding to available functions automatically without inquiring whether the profile indicates that these default functions are enabled. Parameters corresponding to such default functions need not be part of the profile, if desired. In the example shown in FIG. 3B, the login, fax, and LDAP functions are optional so that the MFD inquires about their enablement by considering the parameters included in the profile. Also in this example, the e-mail function is enabled by default so that the MFD does not inquire about these functions. The present invention is not limited to this example and other combinations of optional/default functions are within the scope of the present invention.

At step 370, the MFD inquires whether its profile indicates that the login function is enabled. If the login function is enabled, the MFD displays a login button on its LCD panel at step 375. If the login function is not enabled, the MFD skips to step 380 where it inquires whether its profile indicates that the fax option is enabled. If the fax function is enabled, the MFD displays or enables a fax option on the LCD at step 385. If the fax option is not enabled, the MFD skips to step 390 where it sets an MFD auto logout timer based on a timer value provided in the profile.

At step 395, the MFD inquires whether its profile indicates that the LDAP option is enabled. If the LDAP option is enabled, at step 397 the MFD sets a base Distinguished Name (DN) for an LDAP query provided as part of the profile. The base DN provides a default field of search within which the LDAP search is performed unless a narrower field of search is requested. If the LDAP option is not enabled, the MFD skips the step 397. After performing these steps, the MFD has completed the steps used to gather and set appropriate information used to generate an initial user interface for the MFD. The present invention is not limited to the order of the steps shown in FIGS. 3A-3B.

Using this initial user interface and other menus displayed by the MFD, the user of the MFD can access the various services available on the network through the active server 40 or 45. In general, the active server 40 or 45 receives job information from the image processing device; processes the job information at the active server 40 or 45; and transmits processed information to an application connected to the active document manager server 40 or 45.

FIG. 4 is an example of code included in a software plug-in sent to an MFD, from the document manager server. Once the plug-in is received and processed by the MFD, the MFD can perform operations enabling a user to add specific processing instructions, index data or metadata to the image file before it is processed by the image processing device. The software plug-in is optionally not transmitted to the MFD until the MFD receives the backend parameter and determines the backend applications enabled by the MFD. The MFD then transmits a message to the document manager server indicating that a specific backend application is enabled. The document manager server responds by transmitting the software plug-in to the MFD allowing it to perform all necessary modifications to the MFD user interface and corresponding functionalities. The plug-in also allows the MFD to make a determination regarding the type of user authentication required for the user to gain access to a particular network application. Additionally, the software plug-in enables the MFD device to determine if the user is authenticated on another system, and whether that authentication procedure allows for the user to have access to a particular application. The user interface and of the MFD may also be customized based on the information and the plug-in to allow the user access to specific functionalities for a specific backend system. These capabilities will be described in greater detail below.

It should be further noted that the plug-in information may be transmitted from the authentication server to the MFD upon authentication of a user. As will be described in relation to FIGS. 5A-5B below, when the user is authenticated using a smartcard and/or biometric information the authentication server determines whether user-specific parameters are stored, which correspond to the received user ID and digital signature. The software plug-in can be one of the pieces or user-specific authentication information transmitted from the server to the MFD.

The MFD may optionally be connected to a user authentication device configured to accept information from an electronic card or memory, and/or a biometric device configured to sense biometric information input by a user to facilitate user authentication. These user authentication devices may be located within or near the image processing device, and are in communication with the image processing device. The image processing device and user authentication devices may be connected by any type of wired or wireless connection for facilitating the transfer of information between the devices. It should be noted that while the term "smartcard" is may be used in the application, this term refers to any type of card or memory device for storing user information and capable of being read by an electronic device. Also, the card and the device used to read the card may be a scan sensor used to read directly from the card, or alternatively a proximity sensor configured to read data from the device without physically making contact with the card.

Figure 5A:
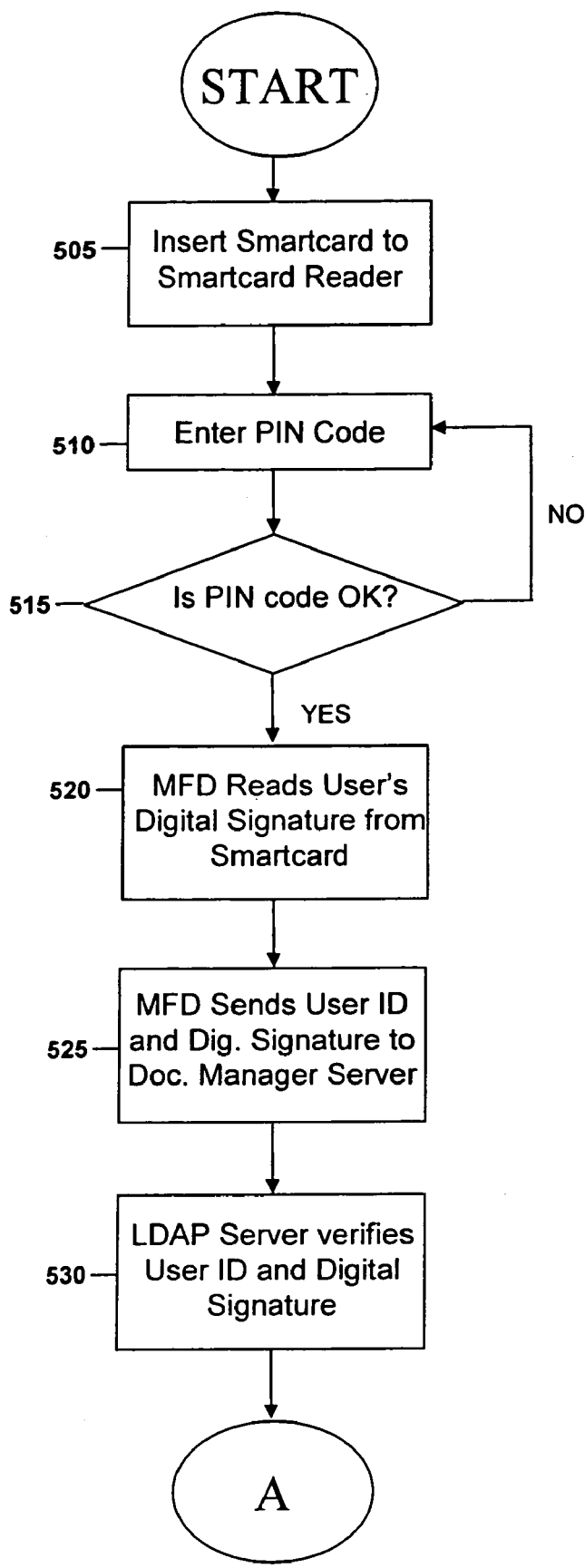
FIGS. 5A and 5B show steps performed in authenticating a user using multi-factor authentication according to one embodiment of the present invention.
Figure 5B:
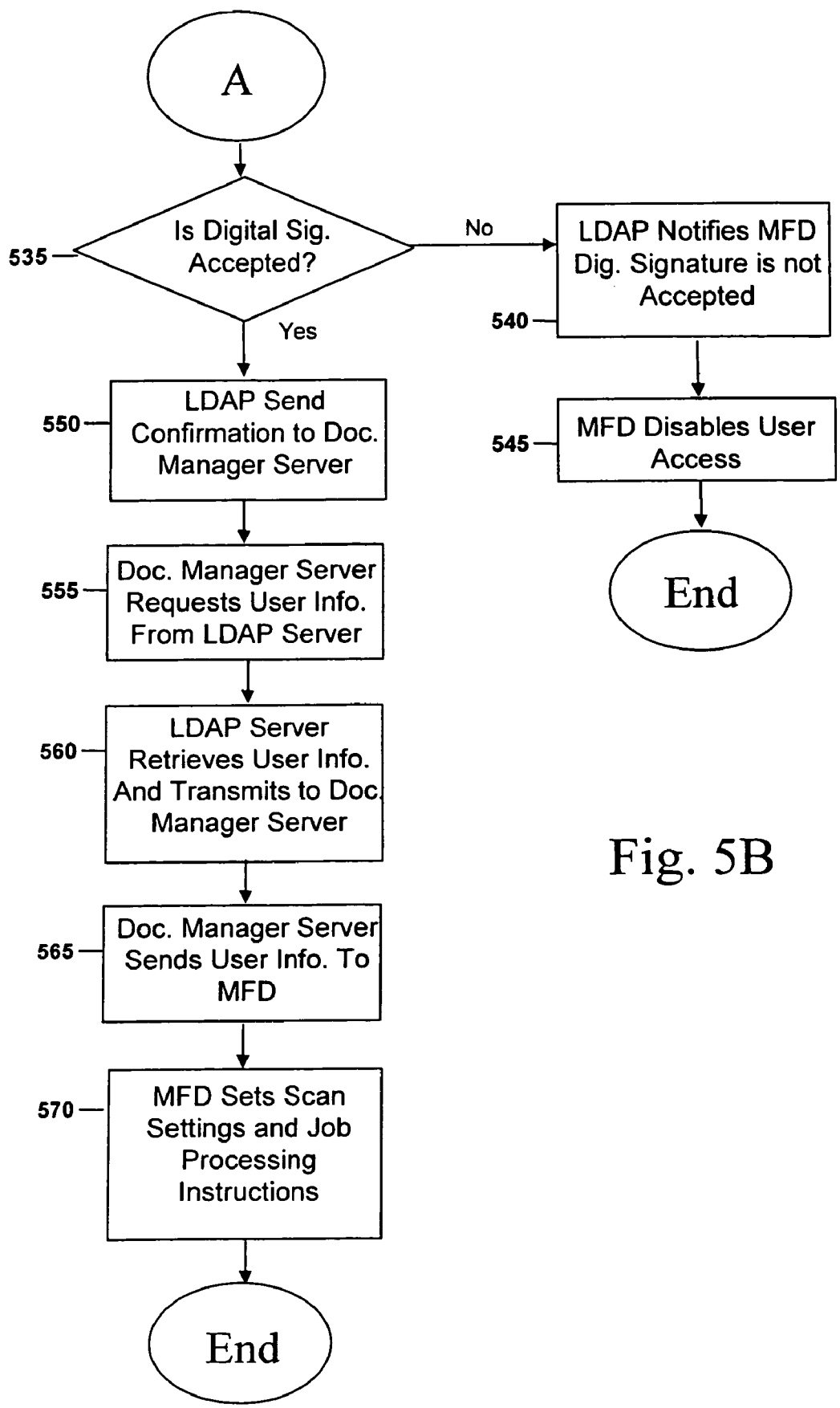

FIGS. 5A and 5B is a flowchart showing a method of authenticating a user according to one embodiment of the present invention. It should be noted that this method of authentication is optional and that other forms of authentication, implementing only single factor user authentication (submitting simply a username and password) may be used. At step 505 the user inserts a smartcard to a smartcard reader. It should be noted that the smartcard reader may be located within the MFD 10-30 or it may be located externally to the MFD 10-30. In a case where the smartcard reader is located in a location not within the MFD 10-30, the MFD may perform the authentication process individually and communicate the result of the authentication with the MFD 10-30 upon either successful or unsuccessful authentication. Once the user enters the smartcard into the smartcard reader the user is prompted for a personal identification number (PIN) at step 510. The user may also be required to enter biometric information related to a physical attribute of the user. This may include reading the users fingerprint, scanning a user's retina, sensing a user's voice, or performing a facial recognition on the user. This entered biometric information may then be compared to specified biometric information stored in the smartcard. Similarly, the PIN is then compared against a PIN stored by the smartcard by the MFD or the smartcard reader at step 515. Once the authentication step is complete and successful, the MFD accesses information stored in the smartcard specific to the user of the card. This information includes user identification, and may include a digital signature associated with the user information. The information retrieved from the smartcard is not limited to user ID or digital signature, but may also include other forms of user-specific information specific to the user. Moreover, a smartcard is not required and the invention may be implemented using alternative devices, memories, processors, and associated reading devices. For example, any desired device containing non-volatile memory can be used.

At step 525 the MFD determines if a digital signature retrieved from the smartcard is valid. If this digital signature is not valid, the MFD disables access for this user at step 520. Alternatively, if the digital signature or other identification information is valid, at step 530 the document management server transmits the user ID and digital signature to the document manager server which then obtains user specific job processing instructions which are sent to the MFD. At step 535 the users sets the document on the MFD for processing. The user is then prompted at step 540 to enter a destination for the processed image, the destination may be an e-mail address, a folder in a document management system, or a network application connected to the document management server. It should also be noted that the destination and various other parameters may automatically be set by the user-specific job processing instructions sent from the document manager server at step 530.

At step 545, encryption is enabled for the processed image based on the user-specific information, or digital signature retrieved from the smartcard at step 525, if encryption is desired. This image may be encrypted using the digital signature retrieved from the smartcard or any other personal information or encryption information stored in relation to the user of the image processing device. At step 550 the user initiates scanning of the image, and at step 555 the MFD sends the encrypted scanned data to the active server 40 or 45. The document manager server then processes the image and at step 560 sends the encrypted scanned data to the intended destination. It should be noted that when the user encryption is enabled, only the processed image may be created, or in the context of encrypting an e-mail, the entire e-mail may be encrypted.

Figure 6A:
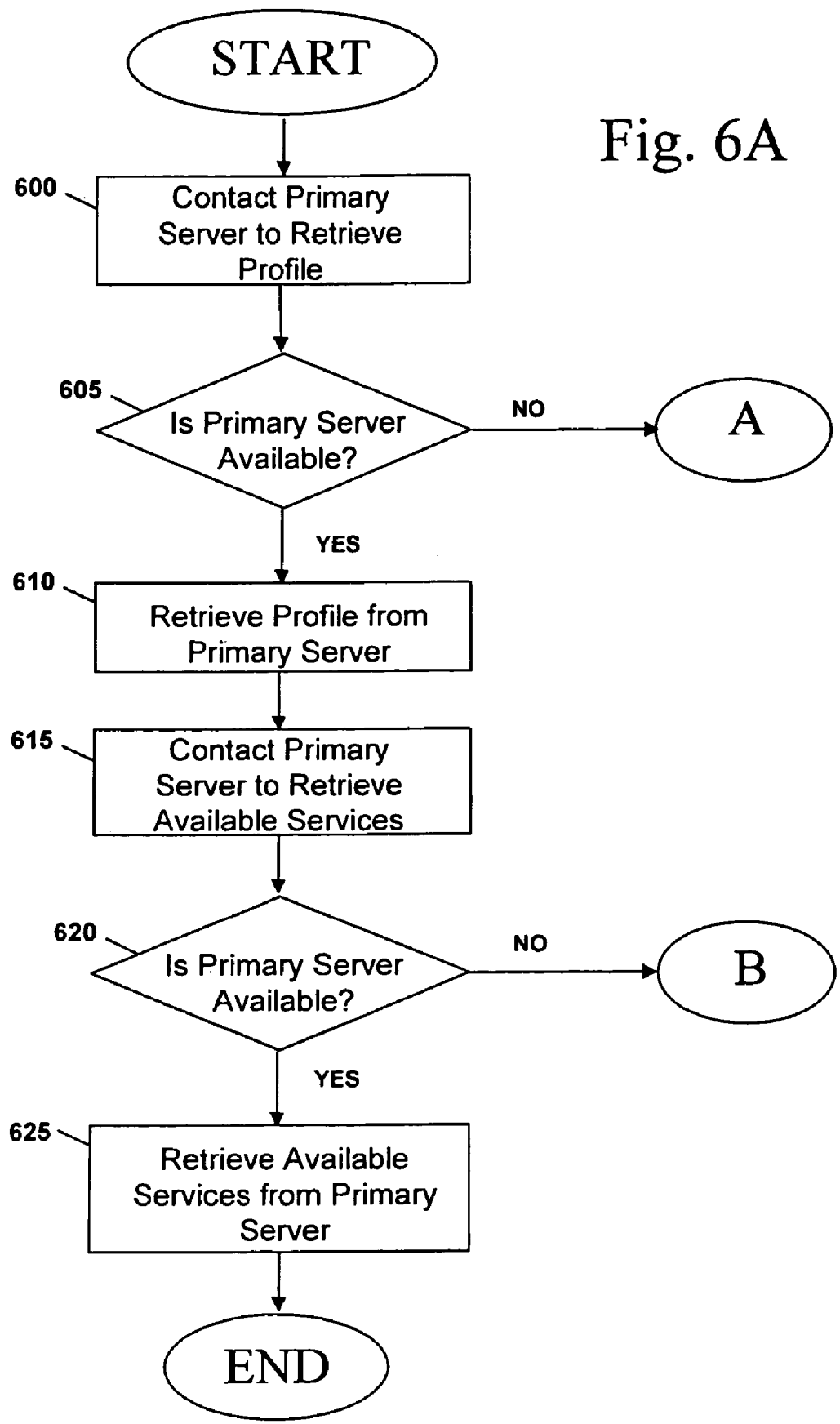
FIGS. 6A and 6B show steps performed in contacting the secondary document manager server upon the detection that the primary document manager server is unavailable during service initiation.
Figure 6B:
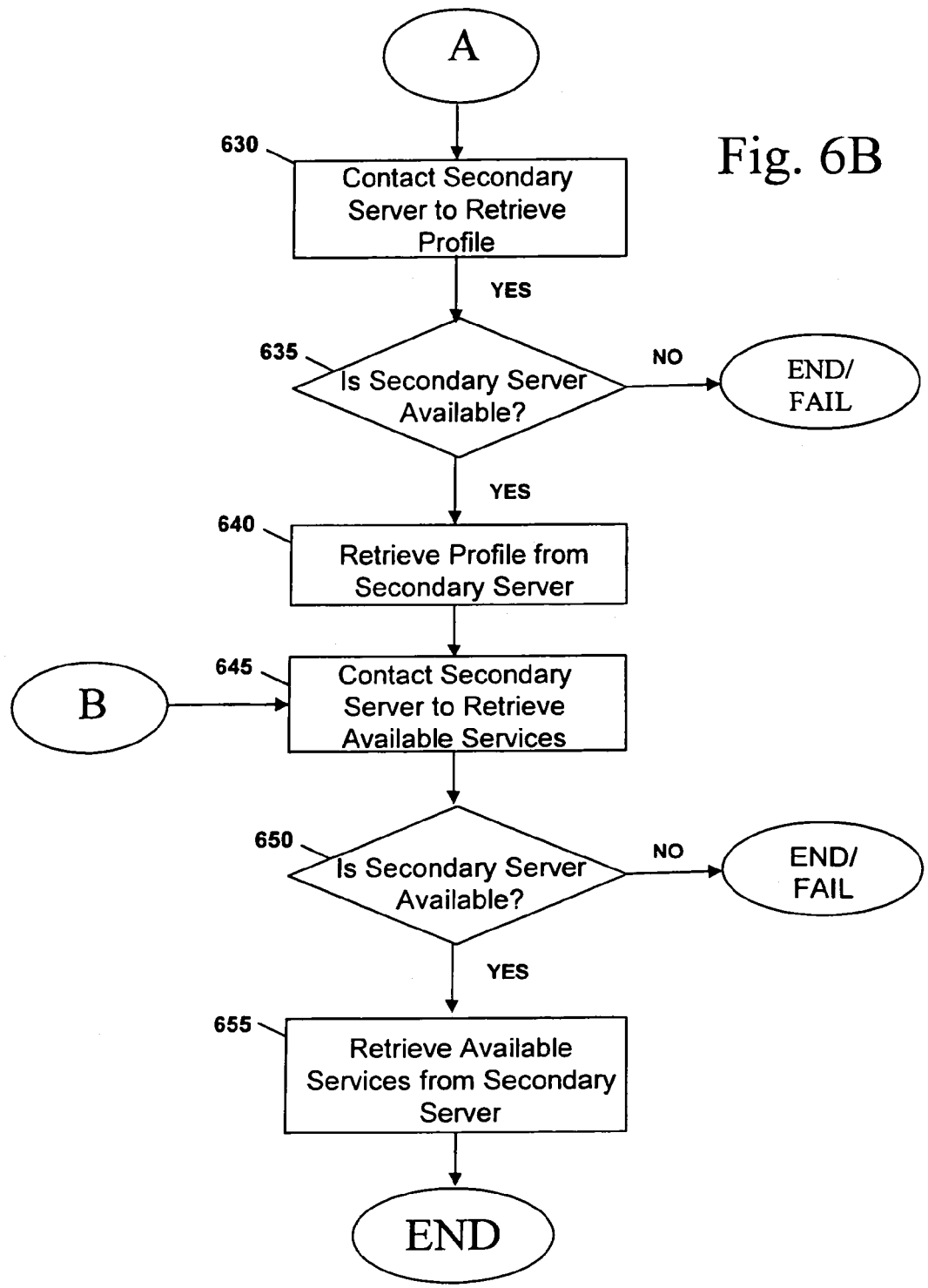

FIGS. 6A and 6B are flowcharts showing a method for providing back-up server functionality upon the detection of a failure of the primary documents manager 40, which is by default the first server contacted by the MFD. Upon boot-up or service initiation at the MFD, the MFD attempts to contact the primary server 40, as specified by identification information (e.g., IP address) stored in the in the MFD. As stated previously, the IP address of the primary and secondary servers is stored in the MFD manually when the MFD is configured for operation on the network 100. The IP addresses of the primary and secondary servers are also respectively communicated to the MFD each time the MFD successfully initiates communication with one of the servers 40 or 45. The back-up server recovery system illustrated in the flowcharts of FIGS. 6A and 6B may begin at any point during the user authentication or profile retrieval steps described previously with relation to FIGS. 3A-3B and 5A-5B.

At step 600, the MFD attempts to contact the primary server identified by an IP address, or other identification or address information stored in the MFD memory, to retrieve profile information. At step 605 the MFD determines if the primary document manager server 40 is available based on a received response, or lack thereof, from the primary document manager server 40. A variety of reasons may exist for the unavailability of the primary document manager server 40. For example, the MFD is able to detect if the primary document manager server 40 is unavailable because it is busy, has suffered a hardware, software or communication failure, or is inflicted by any other condition which renders the primary document manager server 40 unavailable for use. If, at step 605, the primary document manager server 40 is available, the MFD retrieves profile information from the primary document manager server 40. However, if the primary server is determined by the MFD to be unavailable, the MFD contacts the secondary document manager server 45 to retrieve profile information, at step 630. If, at step 605, the MFD determines that the primary document manager server 40 is available, the MFD then retrieves the profile information from the primary server at step 610. The MFD then contacts the primary server to retrieve additional available services, such as login, fax, LDAP etc., as described in reference to FIGS. 3A-3B, at step 615. At step 620, the MFD determines if the primary server is available to transmit a response to the request from the MFD requesting available services. If the primary server is unavailable the MFD contacts the secondary server to retrieve available services at step 645. If the primary server is available at step 620, the MFD retrieves the available services from the primary server at step 625 and resumes normal operations with the primary document manager server 40.

As discussed above, at step 605 if the primary document manager server 40 is determined by the MFD to be unavailable the process proceeds to step 630 in which the MFD contacts the secondary server to retrieve profile information. At step 635, the document manager server determines if the secondary document manager server 45 is available from which to retrieve the profile information. If the secondary document manager server 45 is unavailable the process ends and an error message is displayed at the MFD. However, if the secondary server is available at step 635 the MFD retrieves the profile information from the secondary server at step 640. The process then proceeds to step 645 and the MFD contacts the secondary document manager server 45 to retrieve available services, as described in reference to FIGS. 3A-3B and 5A-5B. At step 650, the MFD determines if the secondary server is available to retrieve available services. If the secondary document manager server 45 is determined to be unavailable by the MFD at step 650, an error message is displayed on the MFD and the MFD is denied access to the available services. However, if, at step 650, the MFD determines that the secondary document manager server 45 is available to retrieve available services the MFD retrieves the available services from the secondary document manager server 45 at step 655. In this manner, the MFD transmits and receiving information both to and from the primary document manager server 40 and the secondary document manager server 45 upon a detected unavailability of the primary document manager server 40.

Figure 7A:
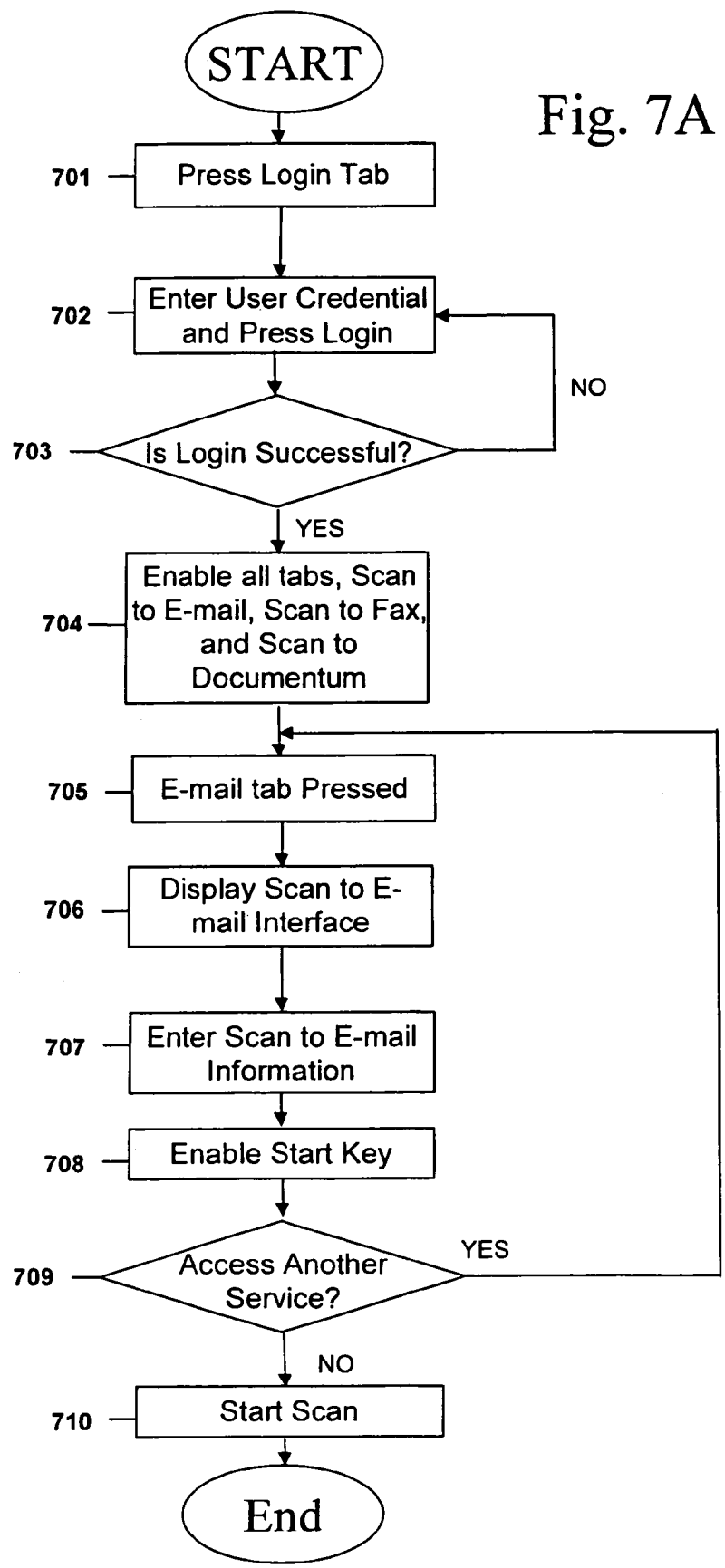
FIGS. 7A-7C show subsequent processing after initial user authentication according to one embodiment of the present invention.
Figure 7B:
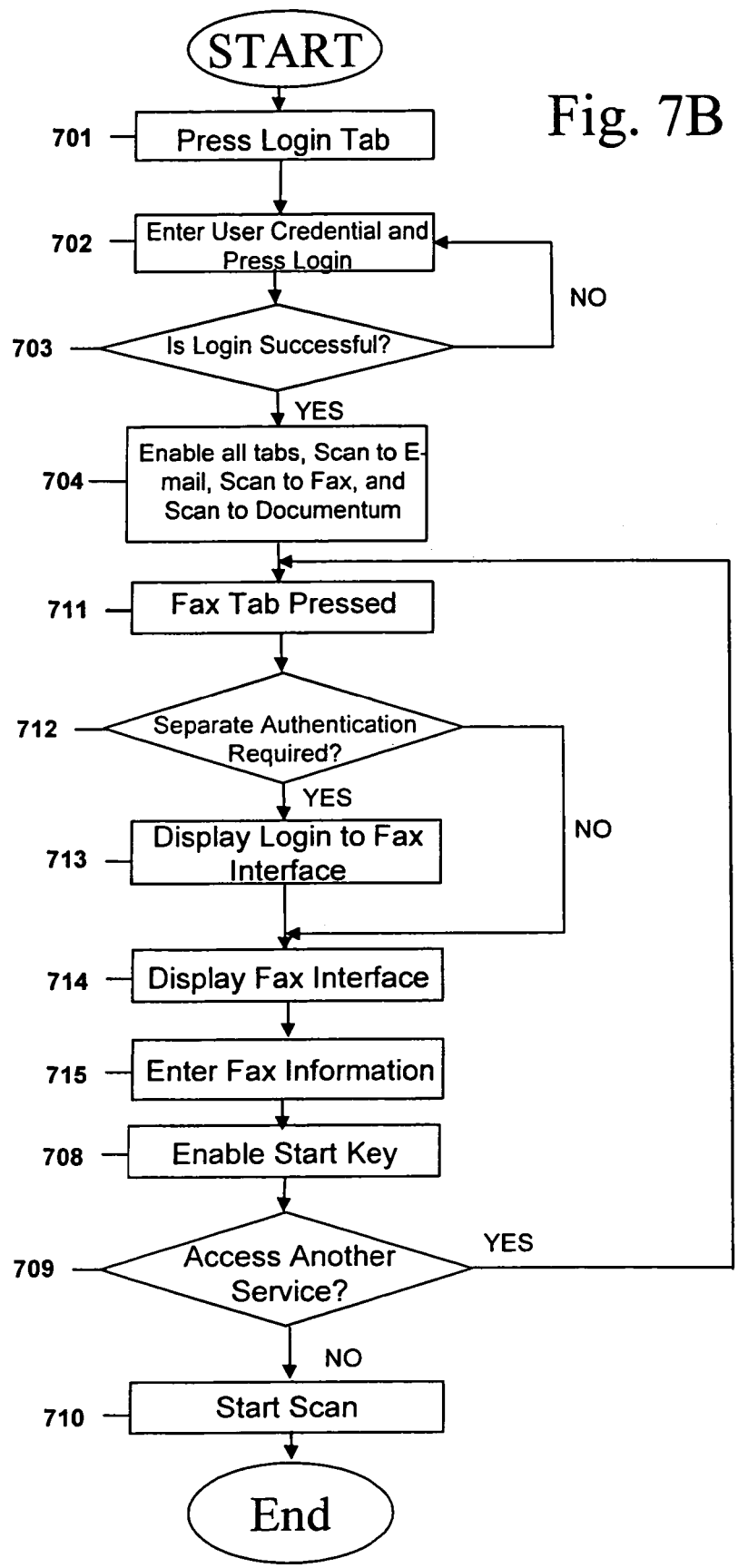
Figure 7C:
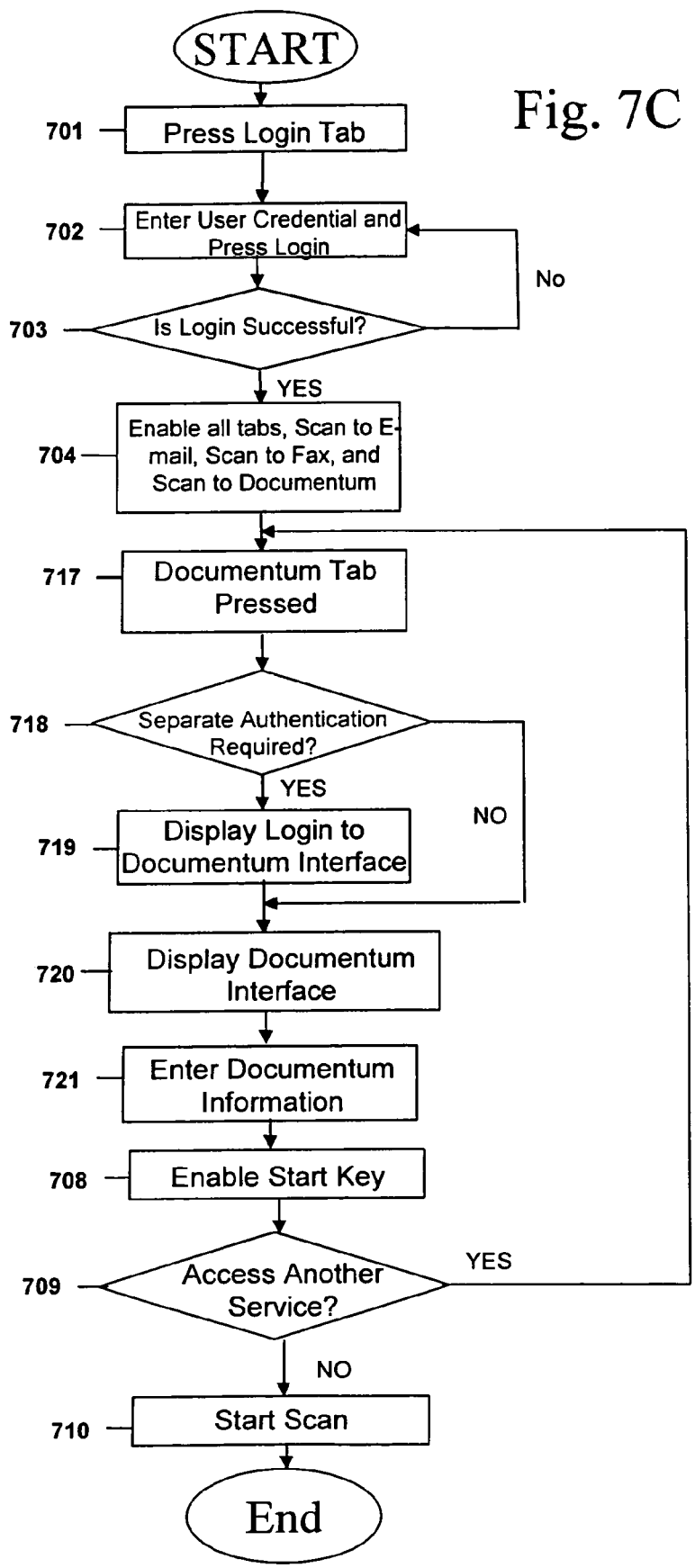

FIGS. 7A-7C are flowcharts showing the process that takes place after the user is currently logged onto a network and profile information has been received by the MFD by way of the process described above. Specifically, FIG. 7A relates to a process for initiating the e-mailing of a scanned image, FIG. 7B relates to a process for faxing a scanned image, and FIG. 7C relates to a method for processing image data to be sent to a backend application. As described above, in all communications with the active server 40 or 45, the MFD attempts to contact the primary server 40 first. However, since either server 40 or 45 is able to perform the process described below, the document manager server 40 or 45 participating in the process will be generically referred to as the active server 40 or 45.

At step 701 the user initiates a network login procedure, such as the login procedure described in reference to FIGS. 3A-3B, by submitting a user name and password or by inserting a smartcard to the card reading device to initiate the login procedure, as described in FIGS. 5A-5B. The user then enters user-specific authentication information at step 702, and if the login is successful at step 703 the active server 40 or 45 transmits profile, plug-in, and other necessary information in step 704 to the MFD. This information can be information from a profile stored in the document manager server, or may also be user-preference information received from the directory server after authentication. This information can be used to, among other things, customized a user interface of the MFD. Once the customized interface is displayed the user can select from a plurality of available options, backend systems, and device settings.

If the "E-mail" tab of the MFD user interface is pressed at step 705, then the process of sending an e-mail from the MFD is initiated. Once this option is selected, the user is presented, at step 706 with a user interface allowing the user to modify the list of intended recipients and subject of the transmitted e-mail at step 707. Once the user enters the appropriate information, the start key is enabled on the MFD at step 708 and the user initiates the scanning and subsequent e-mailing of the image. It should be noted that separate login is typically not required for access to the e-mail system since the user is already authenticated for the network. After completing the image processing and subsequent e-mail, the user is then prompted at step 709 with an option to perform further processing operations. If the user desires additional processing, the process returns to step 704. If the user makes-a selection indicating that they wish to perform no further processing at step 709, and then the image processing is terminated at step 710.

If the user selects the "Right Fax" tab from the MFD user interface at step 711, the process proceeds to step 712. At step 712, the profile, associated plug-in information, and other associated information received by the MFD from the active server 40 or 45 is used by the MFD to determine if another authentication process is required for access to the facsimile application. If no authentication is required, then the "Right Fax" user interface 302 is displayed at step 714. At step 713, if user authentication is required for access to the fax application then the user may be prompted with the login user interface, or the user will be prompted to enter authentication information as discussed in FIGS. 3A-3B and 5A-5B. Once the user enters and submits the required authentication information, the facsimile server checks the user authentication against a database of registered users.

If the user is authenticated by the facsimile server, then the "Right Fax" user interface is displayed at step 714. However, if user authentication is unsuccessful an error message is displayed to the user and the user is denied access to the system. Once the user is authenticated, at step 715, the user is able to enter a billing code, fax numbers, subject for the transmitted fax, and any additional optional information. Should the authentication take place in a manner similar to FIGS. 5A-5B, then the above-mentioned user-entered information may be included in the user-specific preferences retrieved in the server and transmitted to the MFD. Once this information is entered the user initiates the processing of the image by pressing a "Start" key, at step 708 and subsequent facsimile transmission of the image, as described below. The user is then prompted at step 709 with an option to perform further processing operations. If the user desires additional processing, the process returns to step 704. If the user selects no at step 709, then the image processing is terminated.

If the "Documentum" tab or the tab representing any other backend application, is pressed at step 717, the software plug-in (or other information) received by the MFD from the active server 40 or 45 are used to determine at step 718, if a subsequent authentication process is required for the user to gain access to the backend system. Then, at step 719, the user may be prompted to use an authentication procedure similar to that described FIGS. 5A-5B by entering a smartcard and subsequently a PIN and/or biometric information. Alternatively, the "Documentum" login user interface may be displayed at step 719. In this authentication procedure, the user enters a "Username", "Password", and "Docbase" and the MFD transmits these parameters to the backend system for authentication. The backend system then compares the entered "Username" and "Password" against a database of these stored parameters and determines if the user is authorized to access the system. If, however, user authentication is unsuccessful an error message is displayed, and the user is denied access to the application. Upon successful authentication, user-specific parameters may be retrieved from the authentication server and used at the MFD to automatically adjust settings and operations.

Once the user is granted access to the Documentum backend application, the image can be processed by the MFD and management, storage, retrieval and other file management operations can be performed on processed image using a displayed backend application interface at step 720. The user is also able to submit indexing information, metadata, and other customized processing information relating to the processing of the scanned image to the backend application interface at step 721. These parameters may also be included in the user-specific parameters downloaded from the authentication server, as discussed above.

Once the user enters the appropriate information, the start key is enabled at step 708 and the user can initiate the backend processing, as described below. The user is then prompted at step 709 with an option to perform further processing operations. If additional processing is requested the process returns to step 704. If termination of the processing is requested at step 709, then the image processing is terminated at step 710. The process described in relation to the Documentum application can be similarly performed, and the user interfaces similarly customized, for any other suitable backend application.

Additionally, the user of the MFD can request for the document manager server to route a document to an application connected to the document manager server, such as a fax server, an e-mail server, a file format conversion system, an OCR system, a document management system and a file storage system. In this case, the job information includes the document and the request for routing the document to an application.

Figure 8:
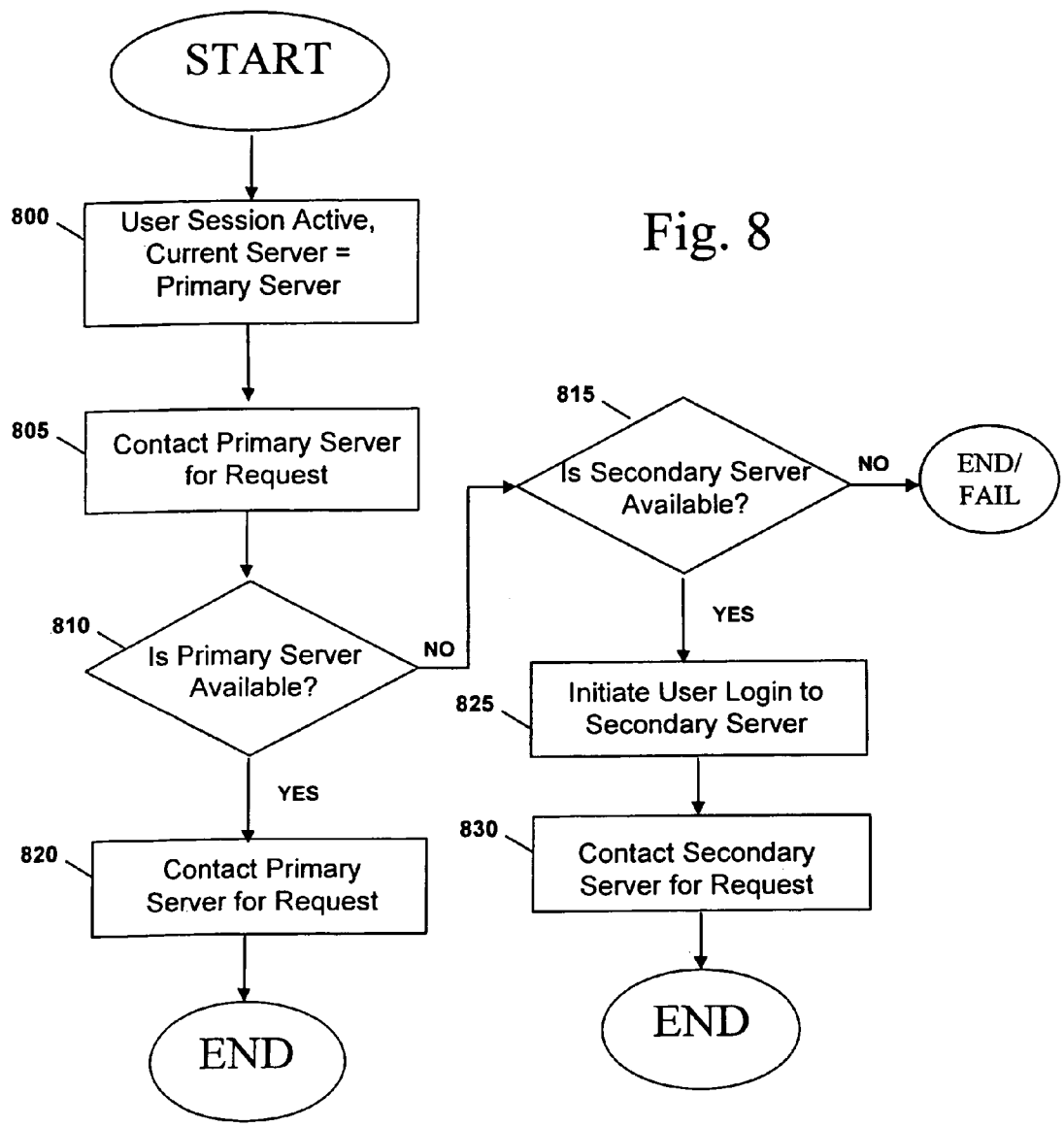
FIG. 8 is a flowchart illustrating the steps performed in contacting the secondary document manager server upon the detection that the primary document manager server is unavailable while a user session is active.

FIG. 8 depicts the process for utilizing a back-up server when the primary document manager server 40 becomes unavailable after the initialization of an active user session. As discussed above, the MFD determines that the primary document manager server 40 is unavailable based on the reception of a message from the primary document manager server 40 or the lack of a response. As discussed above, IP addresses for both document manager servers 40 and 45 are stored in the MFD, and one of the servers is specified as the primary document manager server 40 while the other is specified as the secondary document manager server 45. In this instance the user session is currently activated with the primary server 40. An active user session may be defined as period of time in which the user has logged in to the system but has not yet begun uploading data to the primary document manager server 40, but is still communicating, or attempting to communicate with the primary server 40. The handover described in FIG. 8 may be performed whenever the user is authenticated, or the MFD is registered, but has not yet to start uploading processed data to the document manager server. Examples of the communication between the MFD during the active user session are described in FIGS. 3A-3B or 7A-7C, with the exception of the uploading and login procedures. Examples of processes taking place during a user session may include retrieving an e-mail address from the directory server, selecting the destination of processed image data, etc.

At step 800, the user of the MFD is operating with user session active and the active server is the primary server 40. At step 805 the MFD attempts to contact the primary server 40 to perform a processing step subsequent to user authentication. At step 810, the MFD determines, based on the response, or lack thereof from the primary document server 40, if the primary server 40 is available. If the primary document manager server 40 is determined to be available at step 810, the MFD contacts the primary server to fulfill the processing request at step 820. However, if at step 810 the MFD determines that the primary document manager server 40 is not available, the MFD attempts to contact the secondary document manager server 45 at step 815. If the secondary document manager server 45 is determined by the MFD to be unavailable, the process ends and an error message is returned to the user of the MFD. However, if the secondary document manager server 45 is determined to be available at step 815, the process proceeds to step 825. At step 825, because the server on which the MFD has been registered and subsequent user authentication has been performed is no longer available, the registration and login steps are repeated with the secondary server 45. At step 830, after the MFD has been authenticated at the secondary document manager server 45, the MFD transmits the processing request to the secondary document manager server 45. Therefore, the MFD is provided with the same capabilities as those provided by the primary server 40.

Figure 9A:
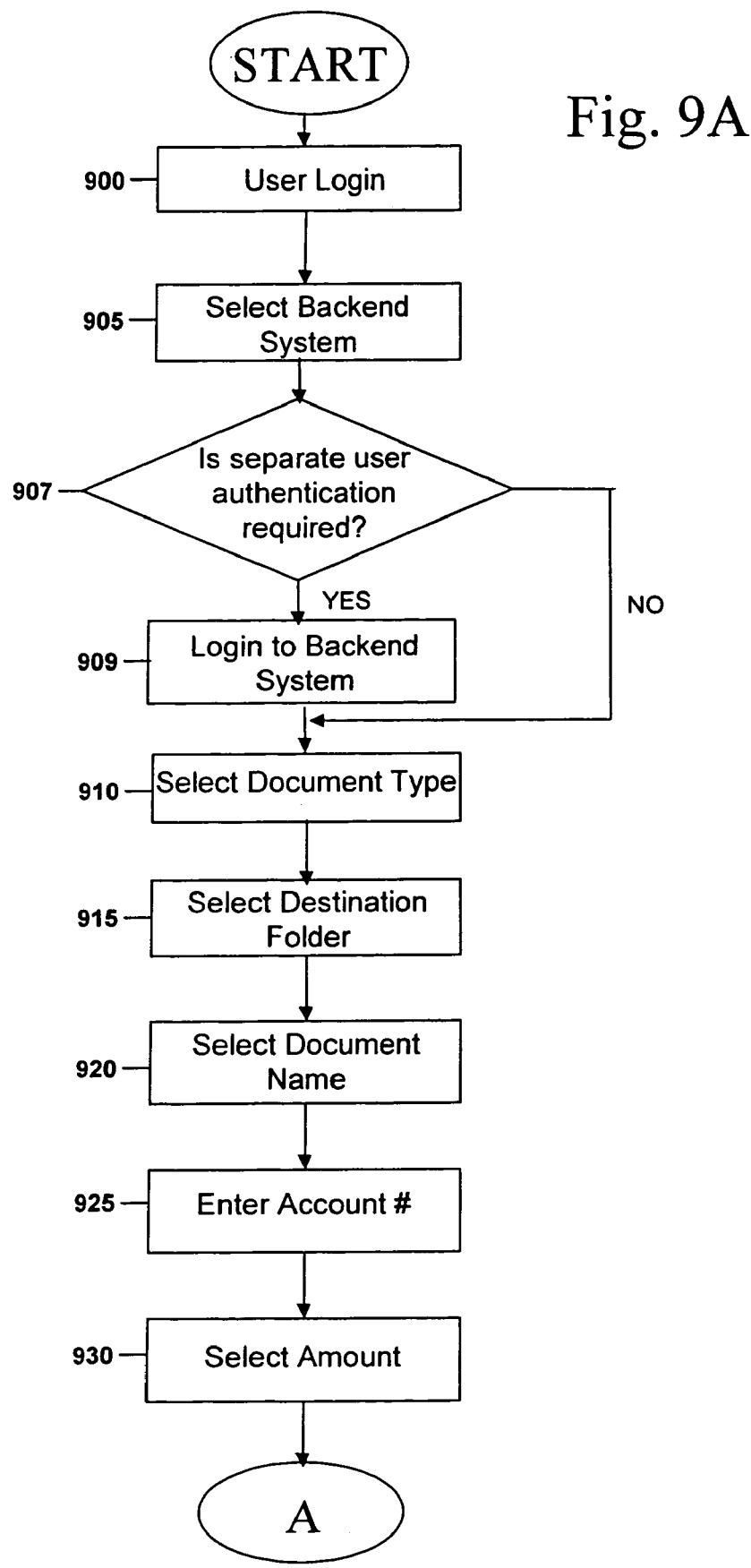
FIGS. 9A and 9B show the steps performed when delivering a document to a back end system according to one embodiment of the present invention.
Figure 9B:
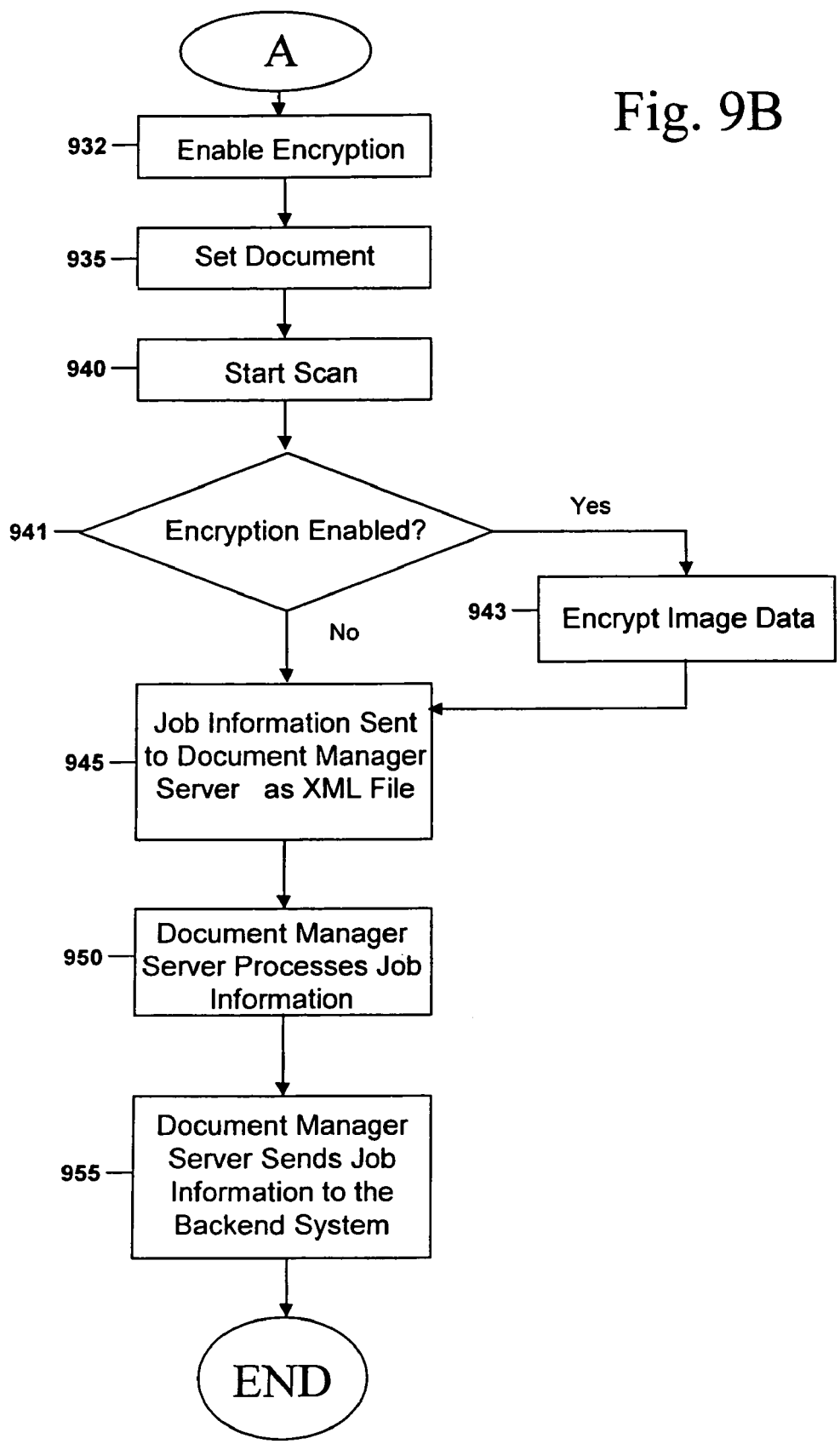

FIGS. 9A-9B depict a flowchart showing an exemplary method of uploading a document to a backend system via active document manager server 40 or 45. As stated above, the MFD attempts to contact the primary server 40 first, for all service requests. However, because the processes described in FIGS. 9A-9B and 10A-10B may be performed via the primary server 40 or the secondary server 45 (in the case that the primary server has been detected by the MFD as unavailable) the document manager server 40 or 45 utilized in the processed described below is referred to as simply the active document manager server 40 or 45.

As mentioned above, a backend system may be for example a document management system or a file to scan system. At step 900, the MFD user can login to a network as discussed above in FIGS. 3A-3B or 5A-5B, and retrieve user-specific parameters for processing an image with the backend system. At step 905, the MFD user can select a backend system, such as a document management system or any other available backend system. The MFD then examines the information received from the active server 40 or 45 (e.g. profile, plug-in, etc.) and determines at step 907 if the user is required to login to the backend system. If no user login is required then the process continues to step 910. If login is required, the user logs into the backend system at step 909 by either entering a username and password or as described above in FIG. 5A-5B. At step 910, the MFD user can select a document type using the MFD input device. For example, a menu of document types can be displayed so that the user can select one of the types using a touch sensitive user interface, or another user interface of the MFD. The document type can be used as index information when storing the document at the backend system. At step 915, the MFD user can select a destination folder where the document will be stored at the backend system. Again, this can be performed by selecting a folder from a list displayed on a user interface, or the destination folder can be entered using a keyboard. At step 920, the MFD user can enter the name of the document and/or other indexing information. At step 925, the user can enter an account number, which can be used by the active server 40 or 45 and/or by the backend system for management purposes, such as billing, accounting, activity monitoring. At step 930, the user can select an amount on an invoice when the document type is an invoice. At step 932 the user may decide to encrypt the processed image, or to insert the processed image into an encrypted communication, as discussed above. Other fields can be displayed on the MFD display in order to prompt the user to enter information (e.g., a numerical value) for different types of documents. It should be noted that any of the above-mentioned settings or preferences may be included in the user-specific preferences that are retrieved from the authentication server upon authentication of the user. Based on these settings the MFD scan settings, preferences, and general functionality may be automatically set or otherwise affected and based on the contents of the file.

At step 935, the document is set on the MFD scanning surface and at step 940, the document is scanned. At step 941 the MFD determines if the user has selected for the processed image to be encrypted. If encryption has been requested, the image is encrypted at step 943. Otherwise, the processed image is transmitted directly to the active server 40 or 45 at step 945, for example as an XML file. The job information can include the selected backend system, the scanned document, a request to route the document to the backend system, the document type, the destination folder, the document name, the account number, the amount, and whether the file is encrypted. At step 950, the active server 40 or 45 processes the job information received from the MFD. In one embodiment, the active server 40 or 45 sends the document to a middle processing system based on the selected backend system. In other words, the active server 40 or 45 can recognize that the selected backend system requires a specific file format. The active server 40 or 45 automatically ensures that the document received from the MFD is in the proper format before sending it to the backend system. At step 955, the active server 40 and 45 transmits at least part of the processed job information (e.g., the document) to the backend system.

Figure 10A:
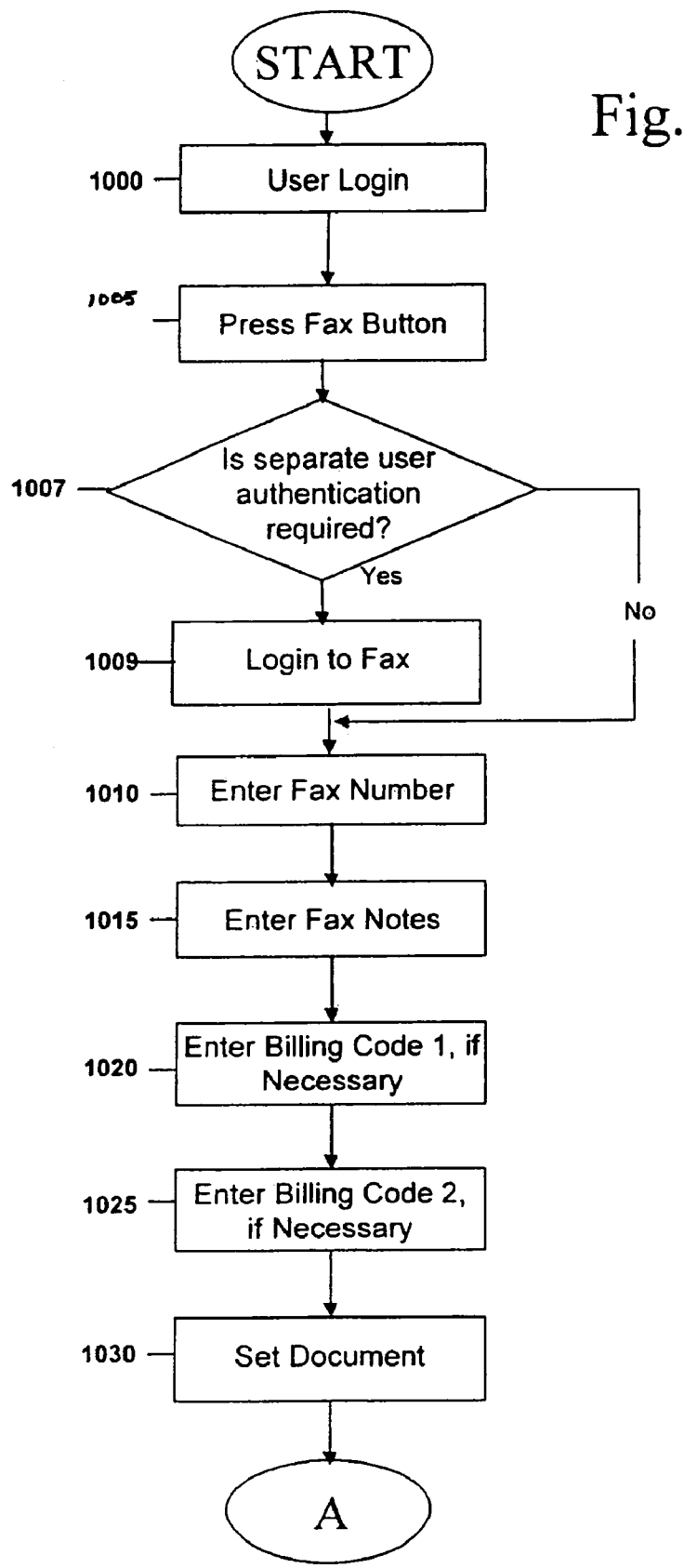
FIGS. 10A and 10B show the steps performed in sending a facsimile according to one embodiment of the present invention.
Figure 10B:
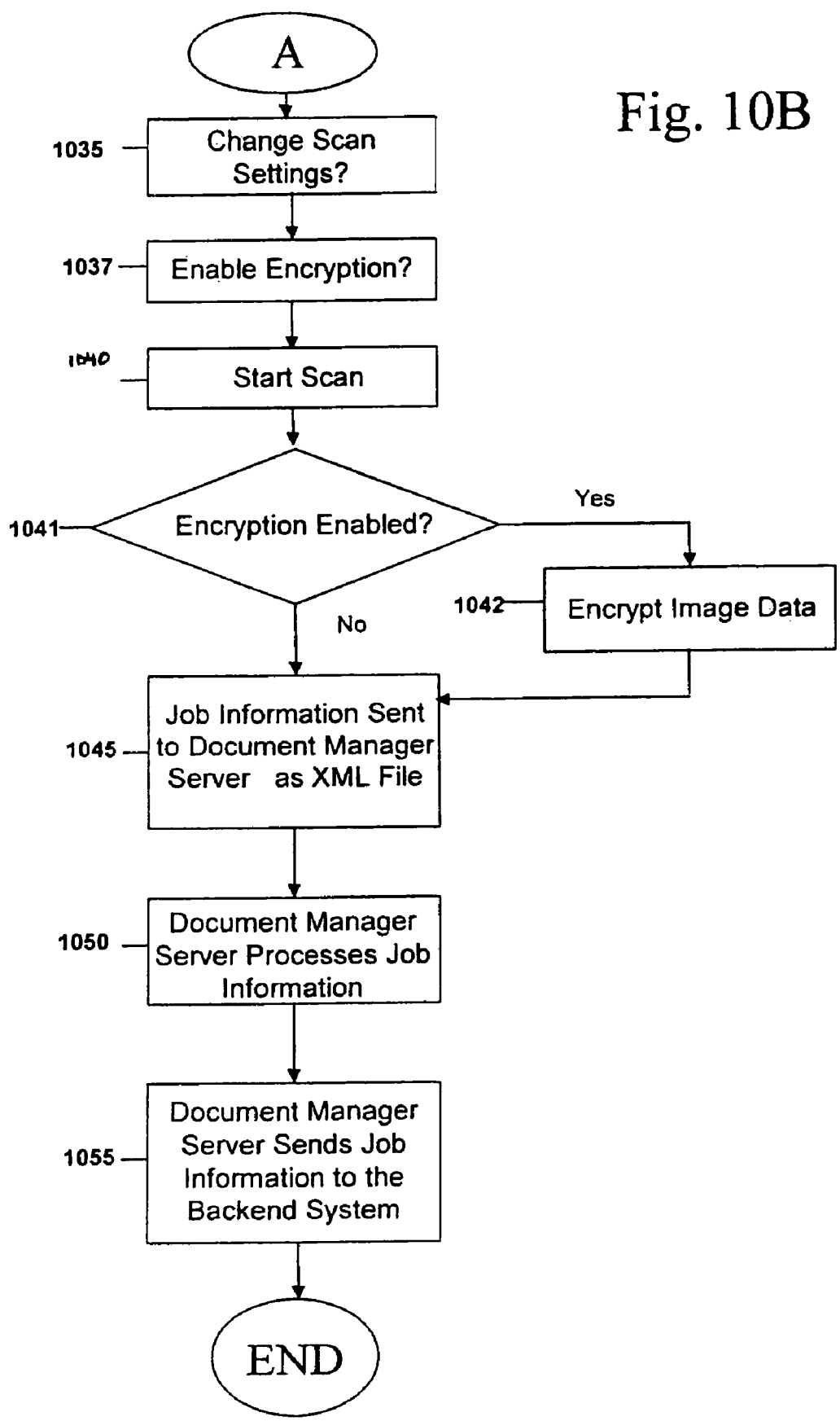

FIGS. 10A-10B show an example of a method for sending a fax using an MFD though the active server 40 or 45. At step

1000, the MFD user can login to a network as discussed above in FIGS. 5A-5B or by submitting a username and password, as described above, and retrieve user-specific parameters for processing an image with the backend system. At step 1005, the MFD user can select a facsimile option at the user interface for the MFD. The MFD then examines the information received from the active server 40 or 45 (e.g. plug-in, profile, etc.) and determines at step 1007 if the user is required to login to the facsimile server. If no user login is required then the process continues to step 1010. If login is required, the user logs into the facsimile server at step 1009. If login is successful, at step 1010, the MFD user can enter a fax number using an MFD input device, such as a touch screen or a keypad. Alternatively, the fax number can be displayed and selected after accessing the global directory 60. At step 1015, the MFD user can enter fax notes that will be transmitted along with the faxed document. The user can enter the fax notes using the MFD input device. At steps 1020-1025, the user can enter billing codes if required in order to fax a document from the MFD. Whether or not the entry of a billing code is required can be determined by a profile parameter. The billing code corresponds to the entity who is billed for the fax service. It should be noted that any of the above-mentioned settings or preferences may be included in the user-specific preferences that are retrieved from the authentication server upon authentication of the user. Based on these settings the MFD scan settings, preferences, and general functionality may be automatically set or affected and based on the contents of the file.

At step 1030, the document can be set on the MFD scanning surface. At step 1035, the scanning settings can be changed if desired, for example by accessing a scan setting menu displayed on the user interface. At step 1037 the user may decide to encrypt the processed image, or to insert the processed image into an encrypted communication, as discussed above. The document is then scanned at step 1040. A determination is then made regarding whether the user has requested that the fax be encrypted at step 1041. If the processed image is to be encrypted, then the MFD used the retrieved encryption data to encrypt the data at step 1042. The encrypted or non-encrypted job information is sent to the active server 40 or 45, for example as an XML file, at step 1045. The job information in this case can include the scanned document, the request to route the document to the fax server, the billing codes, the scanning parameters, and the specified fax number. All which may be input manually, or entered automatically based on the user-specific preference information obtained from the authentication server. At step 1050, the active server 40 or 45 process the job information received from the MFD. At step 1055, the active server 40 or 45 transmits at least part of the processed job information to the fax server in order to complete the fax transmission.

Figure 11:
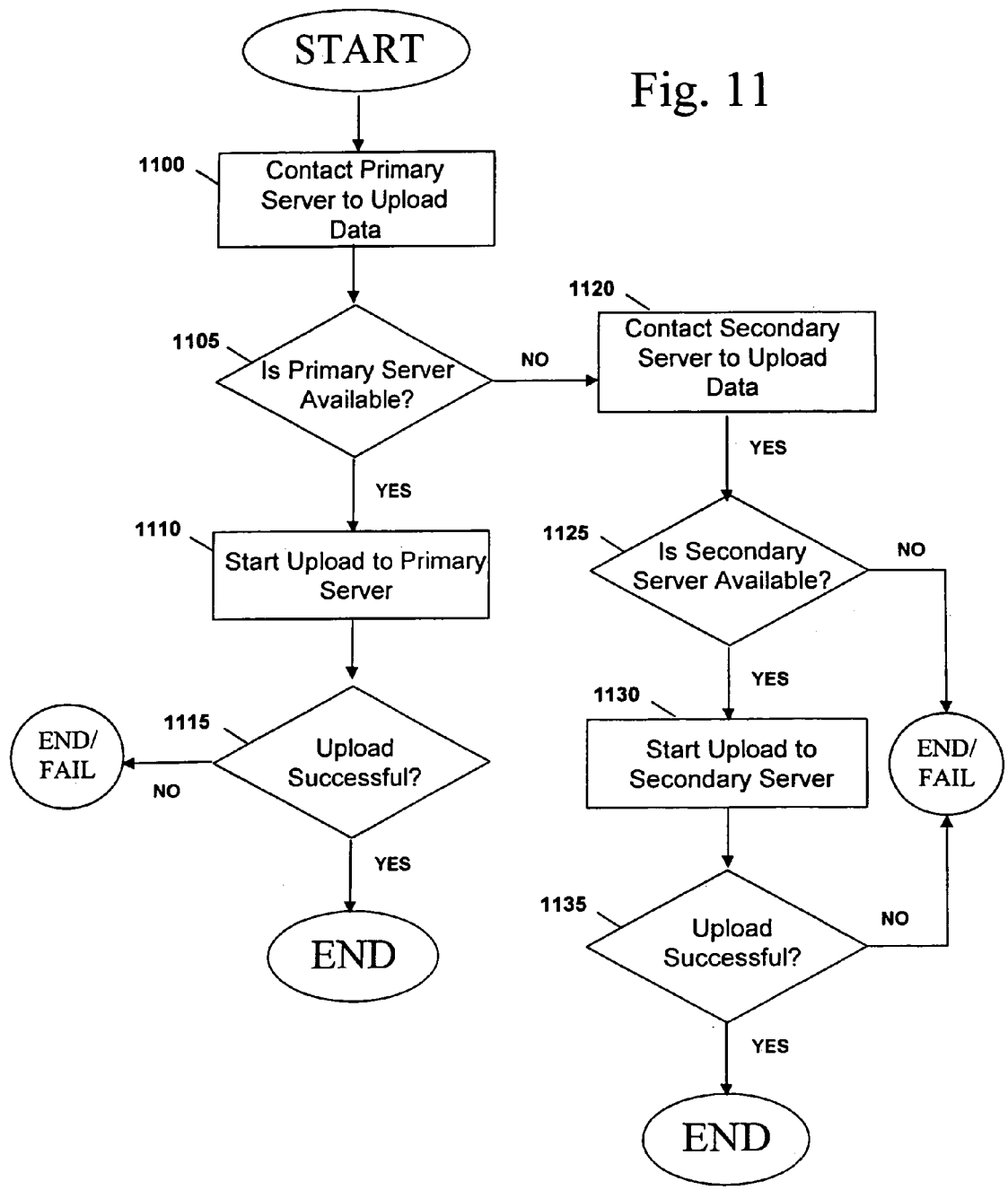
FIG. 11 shows the steps performed in contacting the secondary document manager server when the primary document manager server is detected as being unavailable during an upload process.

FIG. 11 is a flowchart showing a method for providing back-up server functionality during the image data upload procedures described in FIGS. 9A-9B and 10A-10C. The MFD stores IP addresses corresponding to each of the primary server 40 and the secondary server 45 and attempts to communicate with the primary document manager server 40 first, and upon detecting that the primary document manager server 40 is unavailable, attempts to contact the secondary document manager server 45. The MFD determines that the primary document manager server 40 is unavailable based on a message, or absence thereof, of a message received from the primary document manager server 40. Cases in which the primary document manager server 40 may not be available include the failure of software, hardware or communications, the server being busy and as well as any other condition which may render the primary document manager server 40 unavailable for use, as described above. It should be noted that, unlike the back-up procedure described in FIG. 8, if the primary document manager server 40 becomes unavailable during the upload process, the current upload attempt is switched to the secondary document manager server 45 immediately and no subsequent user login or device registration is necessary.

At step 1100 in FIG. 11, the MFD contacts the primary server in an attempt to upload data processed at the MFD to the primary server 40. The MFD could be attempting to upload processed image data to be sent via facsimile, or to send to a backend system, as described in relation to FIGS. 9A-9B and 10A-10B. At step 1105, the MFD determines that the primary document manager server 40 is available for uploading data. If the server is available for upload the MFD begins to upload the processed image data to the primary document manager server 40. At step 1115 the primary document manager server 40 indicates to the MFD whether the upload of data is successful. If the upload of data is unsuccessful in step 1115, an error message is displayed to the user of the MFD.

However, if at step 1105 the MFD determines that the primary document manager server 40 is unavailable the MFD contacts the secondary document manager server 45 at step 1120 in an attempt to upload the data. At step 1125 the MFD determines if the secondary document manager server 45 is available. If the secondary document manager server 45 is determined to be available, the MFD uploads the processed image data to the secondary document manager server at step 1130. If at step 1125 the MFD determines the secondary document manager server is not available or at step 1135 if the uploading of data to the secondary document manager server 45 was unsuccessful an error message is displayed to the user of the MFD.

Figure 12:
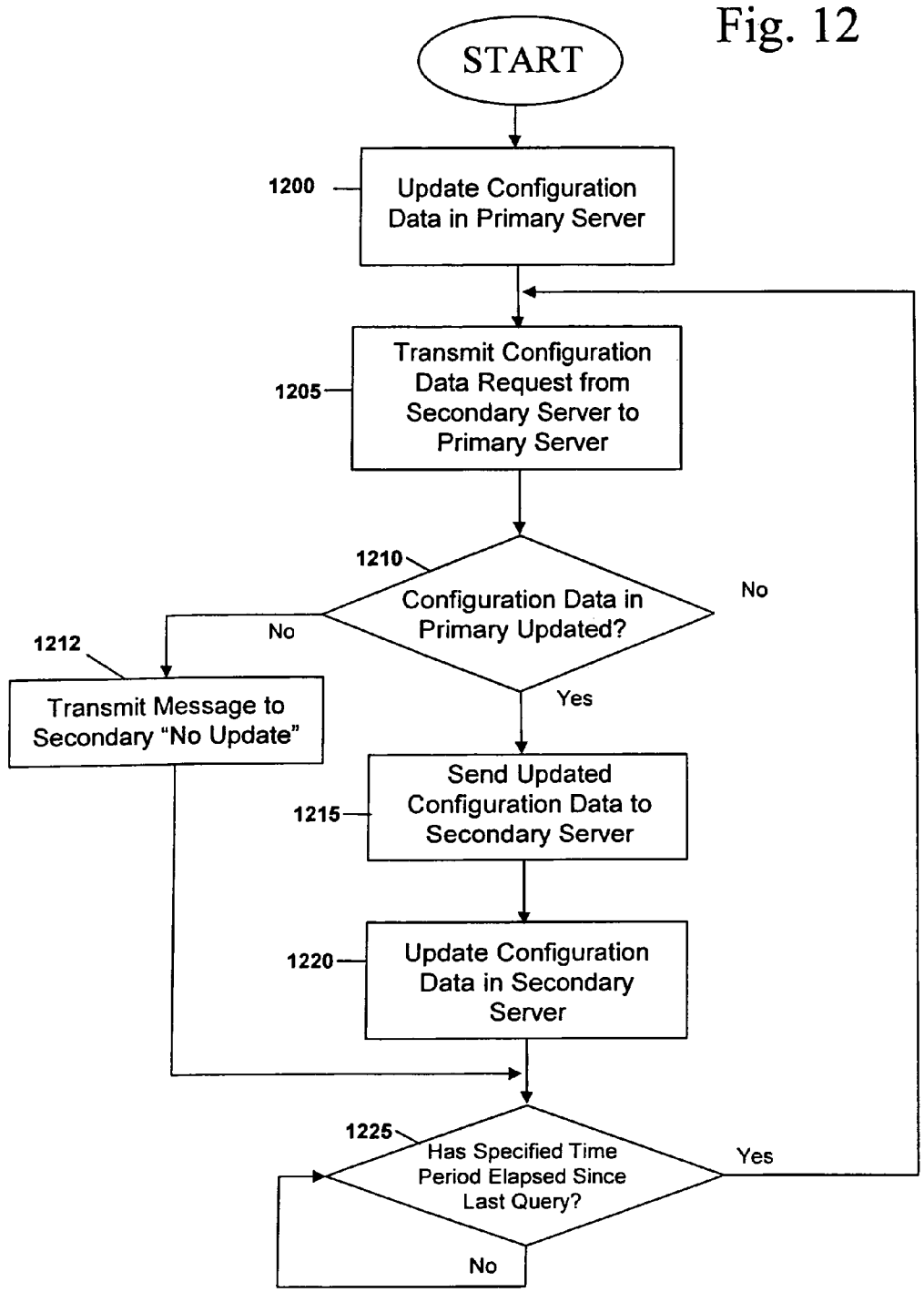
FIG. 12 shows the steps performed in synchronizing configuration data between the primary document manager server and the secondary document manager server.

FIG. 12 is a flowchart showing the steps performed in synchronizing the primary document manager server 40 and the secondary document manager server 45. It should be noted that the primary document manager server 40 and the secondary document manager server 45 have substantially similar set-ups and configurations including software plug-ins, profile information, hardware configuration, functionality, etc. Configuration updates are only permitted to the primary document manager server 40, and the secondary document manager server 45 is not permitted to accept configuration data updates unless it is specified or switched to the role of primary document manager server. Only the primary document manager server 40 contains server license information and in order for the secondary document manager server 45 to be assigned the role of primary server, license information should be activated at the secondary server.

As discussed above, the primary document manager server's IP address is entered manually and stored in the MFD configuration during MFD client installation and every time the MFD contacts the primary document manager server 40, current primary and secondary document manager server IP addresses are returned and stored in the MFD to maintain current configuration information. Also, as stated previously when the MFD is turned on, or service is initiated, it sends the processing request to the primary document manager server 40 first. Therefore, providing updated configuration data to the secondary document manager server 45 from the primary document manager server 40 is important so that the transition of the secondary document manager server 45 to the designation of primary document manager server results in no loss of functionality to the MFD.

FIG. 12 depicts a flowchart of the process of synchronizing configuration data between the primary document manager server 40 and the secondary document manager server 45. At step 1200 the configuration data in the primary server is updated. This update can take place from a user interface connected to the primary document manager server 40, or may be transmitted over a network to the primary document manager server 40. Configuration data updated in the primary document manager server 40 may include but is not limited to profiles, profile information, user preferences, security updates, network configuration changes, software plug-ins, listings of MFDs connected to the primary document manager server 40 or any additional configuration data stored in the document manager server, as discussed above. At step 1205 the secondary document manager server 45 transmits the request for updated configuration data to the primary document manager server 40. At step 1210 the primary document manager server 40 determines if the configuration data has been modified or updated since the last configuration update request from the secondary document manager server 45. If the configuration data in the primary document manager server 40 has been updated, the updated configuration data is transmitted to the secondary document manager server 45 at step 1215 and stored in the secondary document manager server 45 at step 1220. However, if after receiving the request for updated configuration data from the secondary document manager server 45, the primary document manager server 40 determines that configuration data has not been updated since the last request, the primary server 40 transmits a message to this effect to the secondary server at step 1212. The process proceeds to step 1225 in which the secondary document manager server 45 determines if a specified period of time has elapsed since its last request for updated configuration data. If, at step 1225, a specified period of time has elapsed since the secondary document manager server 45 last requested updated configuration data, the process returns to step 1205 and the secondary document manager server 45 sends a request for updated configuration data to the primary document manager server 40. This process allows for the configuration data of the primary and second document manager servers 40 and 45 to be synchronized in the case that an MFD connected to the primary document manager server 40 detects a failure in the primary document manager server and as a result transmits a request and utilize the secondary document manager server 45. It also allows the secondary document manager server 45 to become or to be designated as the primary document manager server should the primary document manager server 40 fail or become unresponsive.

It should be noted that the description provided above describes that the primary server determines if the configuration data has been updated since the last request. However, this step may easily be eliminated and the primary server may just transmit its configuration data in response to any request from the secondary server.

Figure 13:
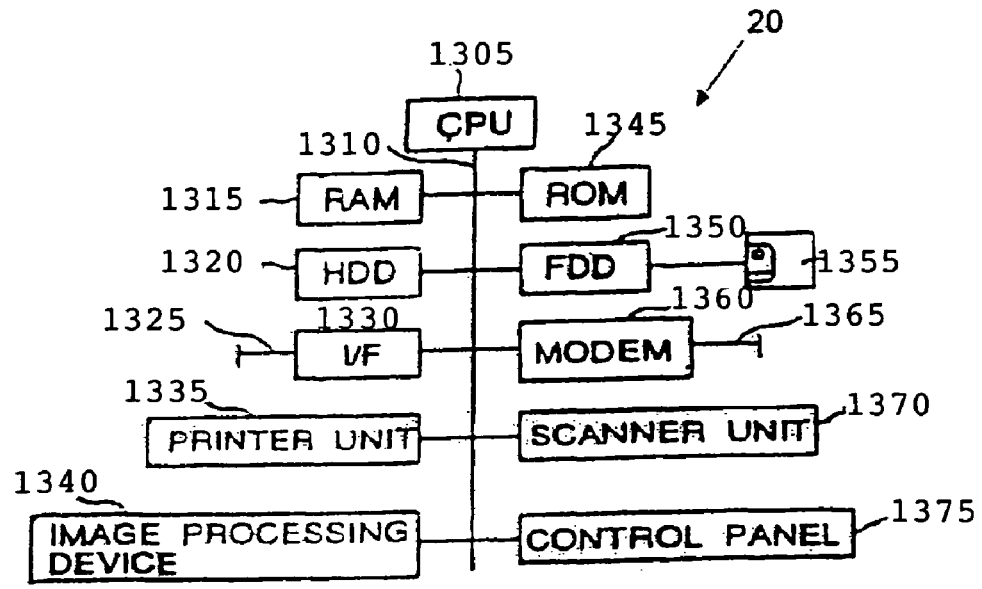
FIG. 13 is a block diagram illustrating an image processing device according to one embodiment of the present invention.
Figure 14:
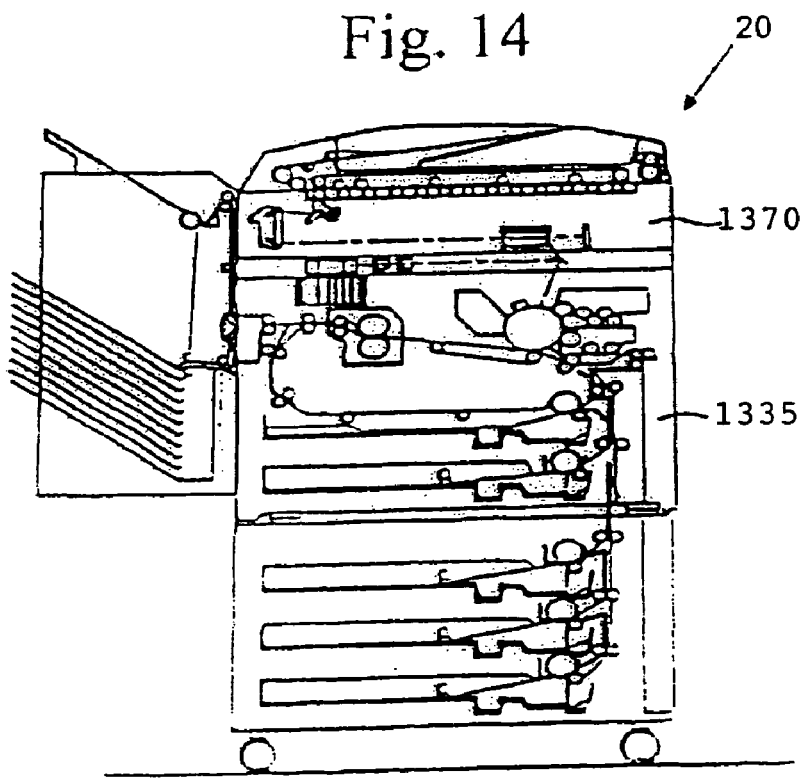
FIG. 14 is a schematic representation of an image processing device according to one embodiment of the present invention.

FIGS. 13 and 14 illustrate an example of the MFD 20, which includes a central processing unit (CPU) 1305, and various elements connected to the CPU 1305 by an internal bus 1310. The CPU 1305 services multiple tasks while monitoring the state of the MFD 20. The elements connected to the CPU 1305 include a read only memory (ROM) 1345, a random access memory (RAM) 1315, a hard disk drive (HDD) 1320, a floppy disk drive (FDD) 1350 capable of receiving a floppy disk 1355, a communication interface (I/F) 1330, and a modem unit 1360. In addition, a control panel 1375, a scanner unit 1370, a printer unit 1335, and an image processing device 1340 can be connected to the CPU 1305 by the bus 1310. Both the I/F 1330 and the modem unit 1360 are connected to a communication network 100.

In a preferred embodiment, the program code instructions for the MFD 20 are stored on the HDD 1320 via an IC card. Alternatively, the program code instructions can be stored on the floppy 1355 so that the program code instructions may be read by the FDD 1350, transferred to the RAM 1315 and executed by the CPU 1305 to carry out the instructions. These instructions can be the instructions to perform the MFD's functions described above. These instructions permit the MFD 20 to interact with the document manager servers 40 and 45 via browser 25 and to control the control panel 1335 and the image processing units of the MFD 20.

During a start-up of the MFD 20, the program code instructions may be read by the CPU 1305, transferred to the RAM and executed by the CPU 1305. Alternatively, the program code instructions may be loaded to the ROM 1345. It is therefore understood that in the present invention any of the floppy disk 1355, the HHD 1330, the RAM 1315, and the ROM 1345 correspond to a computer readable storage medium capable of storing program code instructions. Other devices and medium that can store the instructions according to the present invention include for example magnetic disks, optical disks including DVDs, magneto-optical disks such as MOS, and semiconductor memory cards such as PC cards, compact flash cards, smart media, memory sticks, etc.

In a preferred embodiment, the control panel 1375 includes a user interface that displays information allowing the user of the MFD 20 to interact with the document manager servers 40 and 45. The display screen can be a LCD, a plasma display device, or a cathode ray tube CRT display. The display screen does not have to be integral with, or embedded in, the control panel 1375, but may simply be coupled to the control panel 1375 by either a wire or a wireless connection. The control panel 1375 may include keys for inputting information or requesting various operations. Alternatively, the control panel 1375 and the display screen may be operated by a keyboard, a mouse, a remote control, touching the display screen, voice recognition, or eye-movement tracking, or a combination thereof.

Figure 15:
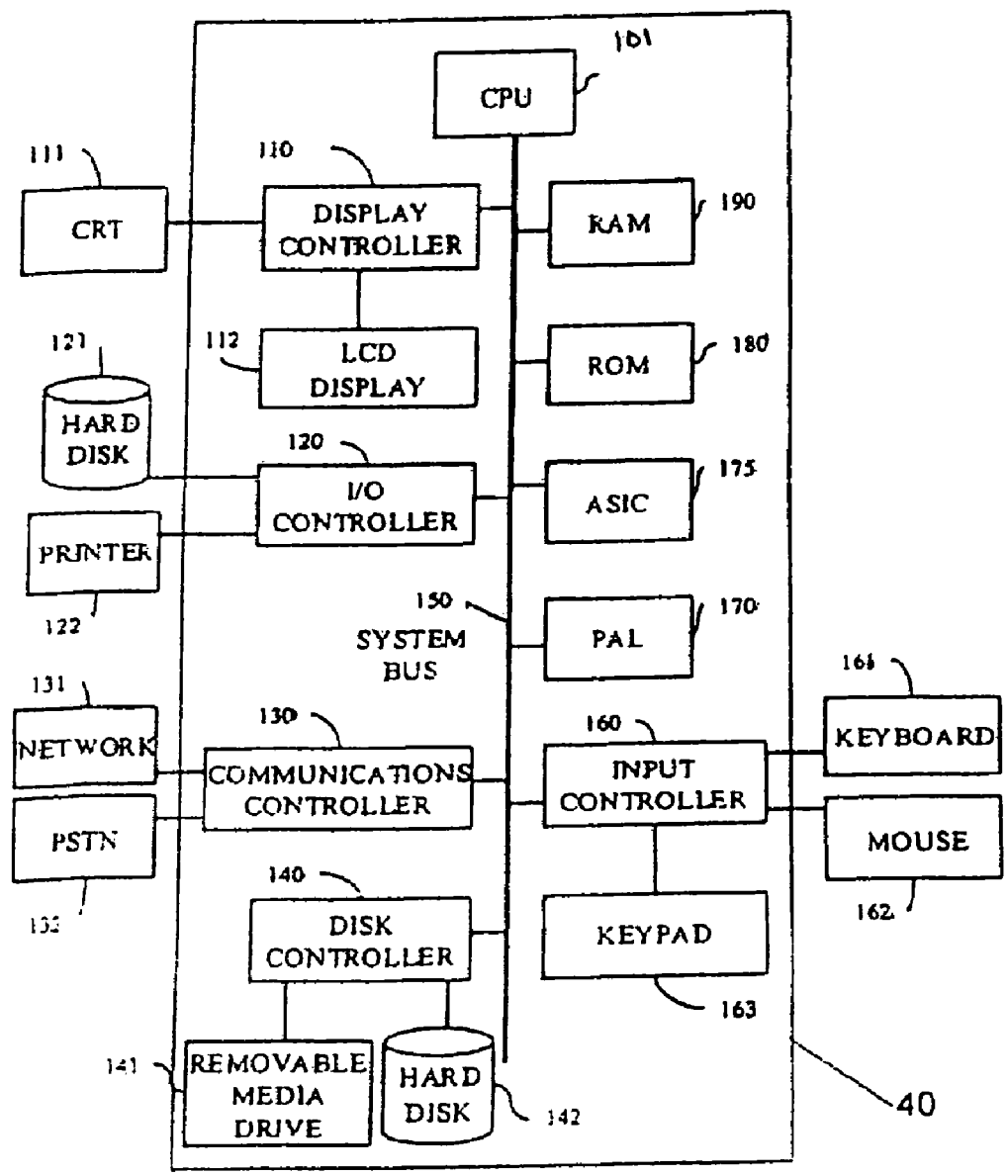
FIG. 15 is a block diagram illustrating a primary and/or secondary document manager server according to one embodiment of the present invention.
Figure 16:
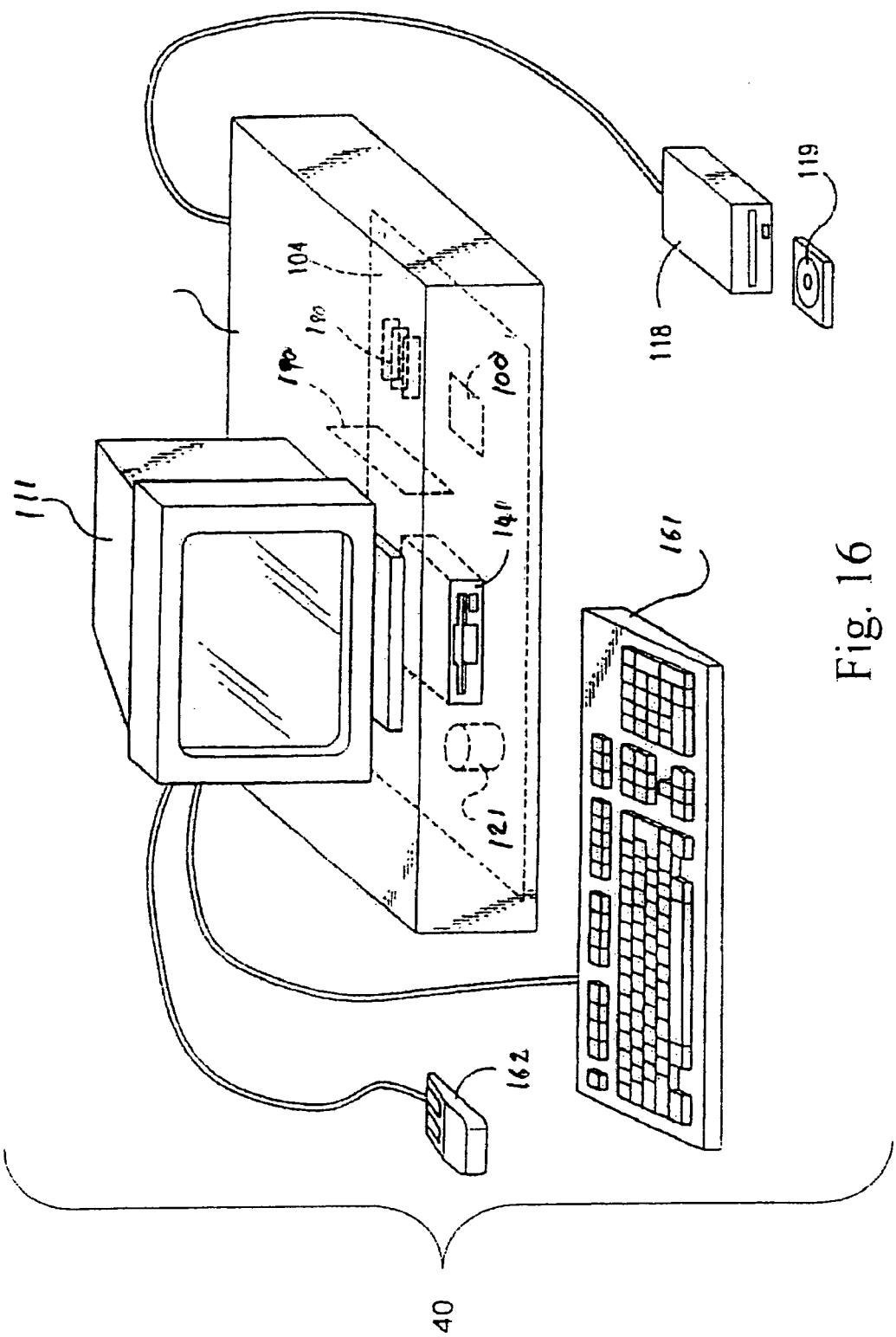
FIG. 16 is a schematic representation of a primary and/or secondary document manager server according to one embodiment of the present invention.

FIG. 15 is a block diagram of servers 40, 45, 50, 60 according to one embodiment of the present invention and FIG. 16 is a schematic representation of the servers. The servers 40, 45, 50, 60 include a central processing unit 101 (CPU) that communicates with a number of other devices by way of a system bus 150. The servers 40, 45, 50, 60 also include a random access memory (RAM) 190 that hosts temporary storage values used in implementing the authenticating, routing and managing functions of documents.

A conventional personal computer or computer workstation with sufficient memory and processing capability may also be configured to operate as the document manager servers 40 and 45. The central processing unit 101 is configured for high volume data transmission and performing a significant number of mathematical calculations in processing communications and database searches. A Pentium 4 microprocessor such as the 3.4 GHz Pentium 4 manufactured by Intel Inc. or Advanced Micro Devices (AMD) Athlon 64 3.5 GHz processor may be used for the CPU 101. Other suitable processors and multiple processors or workstations may be used as well.

The ROM 180 is preferably included in a semiconductor form although other read-only memory forms including optical media may be used to host application software and temporary results. The ROM 180 connects to the system bus 150 for use by the CPU 101. The ROM 180 includes computer readable instructions that, when executed by the CPU 101, can perform the different authenticating, routing and managing functions discussed above associated with scanned documents from MFDs. An input controller 160 connects to the system bus 150 and provides an interface with peripheral equipment, including a keyboard 161 and a pointing device such as a mouse 162. The input controller 160 may include different ports such as a mouse port in the form of a PS2 port or, for example, a universal serial bus (USB) port. The keyboard port for the input controller 160 is in the form of a mini-DIN port although other connectors may be used as well. The input controller 160 provides sound card connections so that external jacks on the sound card allow users to attach microphone speakers or an external sound source. The input controller 160 also may include serial ports or parallel ports as well.

A disk controller 140 is in the form of an IDE controller and connects via ribbon cables to a floppy disk drive 141 as well as a hard disk drive 142, a CD-ROM drive 118 and a compact disk 119. In addition, a PCI expansion slot is provided on the disk controller 140 or mother board that hosts the CPU 101. An enhanced graphic port expansion slot is provided and provides 3-D graphics with fast access to the main memory. The hard disk 121 may also include a CD-ROM that may be readable as well as writeable. A communication controller 130 provides a connection, for example by way of an Ethernet connection to a network 131, which can be the network 101. In one embodiment, the network 131 and the connection to the communication controller 130 are made by way of a plurality of connections including a cable-modem connection, DSL connection, dial-up modem connection, and the like that connect to the communication controller 130.

An input/output controller 120 also provides connections to external components such as an external hard disk 121, printer 122, which can be MFD 10-3, for example, by way of an RS 232 port, a SCSI bus, an Ethernet or other network connection which supports any desired network protocol such as, but not limited to TCP/IP, IPX, IPX/SPX, or NetBEUI.

A display controller 110 interconnects the system bus 150 to a display device, such as a cathode ray tube (CRT) 111. While a CRT is shown, a variety of other display devices may be used such as an LCD, or plasma display device.

The mechanisms and processes set forth in the present description may be implemented using a conventional general purpose microprocessor(s) programmed according to the teachings of the present specification, as will be appreciated to those skilled in the relevant arts. Appropriate software coding can readily be prepared by skilled programmers based on the teachings of the present disclosure, as will also be apparent to those skilled in the software art. In particular, the computer program product for authenticating, routing, and managing documents according to the present invention can be written in a number of computer languages including but not limited to C, C++, Fortran, and Basic, as would be recognized by those of ordinary skill in the art. The invention may also be implemented by the preparation of applications specific integrated circuits or by interconnecting an appropriate network of conventional component circuits, as will be readily apparent to those skilled in the art. Thus, the invention is not limited to the implementations shown in the specification, and ordinary programming and methods of generating interfaces which are alternative to web interfaces, http, etc. may be used.

The present invention thus also includes a computer-based product that may be hosted on a storage medium and include instructions that can be used to program a computer to perform a process in accordance with the present invention. This storage medium can include, but is not limited to, any type of disk including floppy disks, optical disks, CD-ROM, magneto-optical disks, ROMs, RAMs, EPROMs, EEPROMs, Flash Memory, Magnetic or Optical Cards, or any type of media suitable for storing electronic instructions.

Advantageously, the present invention can be incorporated with the system and method for managing documents disclosed in application Ser. No. 09/795,438, filed Mar. 1, 2001; U.S. application Ser. No. 10/243,645, filed Sep. 16, 2002; and U.S. application Ser. No. 10/294,607, filed Nov. 15, 2002; the entire content of each are hereby incorporated by reference.

This application is related to U.S. Patent Publication No. 2006/0224686, filed as U.S. application Ser. No. 11/092,836, on Mar. 30, 2005, entitled "System and Method for Managing Documents with Multiple Network Applications," the entire contents of which are incorporated herein by reference. This application is also related to U.S. Patent Publication No. 2006/0230286, filed as U.S. application Ser. No. 11/092,831, on Mar. 30, 2005, entitled "System and Method Authenticating a User of an Image Processing System," the entire contents of which are incorporated herein by reference.

Obviously, numerous modifications and variations of the present invention are possible in light of the above teachings. It is therefore to be understood that within the scope of the appended claims, the invention may be practiced otherwise than as specifically described herein.

The invention claimed is:

1. A method of compensating for server unavailability in an image processing system, comprising:
    determining, at an image processing device, that a first server is unavailable;
    transmitting identification information from the image processing device to a second server;
    retrieving, at the second server, information corresponding to the identification information;
    transmitting the information corresponding to the identification information from the second server to the image processing device;
    storing license information at the first server;
    activating license information at the second server upon determining that the first server is unavailable;
    updating configuration data of the first server, wherein the configuration data includes security information, software plug-ins, and a list of network applications connected to the first server;
    retrieving, by the second server, the updated configuration data from the first server; and
    storing, by the second server, the updated configuration data retrieved from the first server as configuration data.

2. The method of claim 1, wherein the step of determining that the first server is unavailable comprises:
    determining that the first server has not responded within a predetermined period of time.

3. The method of claim 1, wherein the step of determining that the first server is unavailable comprises:
    determining that the first server is unavailable based on an error message received at the image processing device from the first server.

4. The method of claim 1, wherein the step of transmitting the identification information comprises:
    transmitting identification information corresponding to the identity of the image processing device.

5. The method of claim 4, wherein the step of transmitting the identification information comprises:
    transmitting a serial number of the image processing device.

6. The method of claim 1, wherein the step of transmitting the identification information comprises:
transmitting identification information corresponding to an identity of a user of the image processing device.

7. The method of claim 6, wherein the step of transmitting the identification information comprises:
transmitting a username and password.

8. The method of claim 1, wherein:
the step of determining that the first server is unavailable is performed after transmitting identification information from the image processing device to the first server.

9. The method of claim 1, wherein:
the step of determining that the first server is unavailable is performed before transmitting identification information from the image processing device to the first server.

10. The method of claim 1, wherein the step of retrieving the information comprises:
retrieving profile information corresponding to the image processing device.

11. The method of claim 10, wherein the step of retrieving the information comprises:
retrieving the profile information which includes an identification of each of a plurality of network applications connected to the first and second servers.

12. The method of claim 10, further comprising the step of:
storing identical profile information in both the first and second servers.

13. The method of claim 1, wherein the step of retrieving the information comprises:
retrieving at least one executable file corresponding to each of a plurality of network applications identified in the information received from the second server.

14. The method of claim 1, further comprising the step of:
storing information at the first and second server corresponding to each network application connected to the first and second servers.

15. The method of claim 1, further comprising the step of:
storing an internet protocol address of the first server at the image processing device.

16. The method of claim 1, further comprising the step of:
transmitting internet protocol address information of the first and second server to the image processing device each time the image processing device transmits information to the first server; and
storing the IP address information for the first and second servers at the image processing device.

17. The method of claim 1, further comprising the step of:
performing a user authentication operation at the second server when the image processing device determines that the first server is unavailable.

18. The method of claim 1, wherein the step of determining that the first server is unavailable comprises:
determining that the first server is unavailable while transmitting job information from the image processing device to the first server.

19. The method of claim 18, further comprising the step of:
transmitting the job information from the image processing device to a second server upon a detection that the first server is unavailable;
processing the job information at the second server; and
transmitting processed job information from the second server to at least one of a plurality of network applications connected to the server.

20. The method of claim 19, wherein:
the step of transmitting processed job information comprises transmitting the job information to a document management system.

21. A system of compensating for server unavailability and image processing system, comprising:
means for determining, at an image processing device, that a first server is unavailable;
means for transmitting identification information from the image processing device to a second server;
means for retrieving, at the second server, information corresponding to the identification information;
means for transmitting the information corresponding to the identification information from the second server to the image processing device;
means for storing license information in the first server;
means for activating license information in the second server upon determining that the first server is unavailable;
means for updating configuration data of the first server, wherein the configuration data includes security information, software plug-ins, and a list of network applications connected to the first server;
means for retrieving, by the second server, the updated configuration data from the first server; and
means for storing, by the second server, the updated configuration data retrieved from the first server as configuration data.

22. The system of claim 21, wherein:
the means for determining that the first server is unavailable determines that the first server has not responded within a predetermined period of time.

23. The system of claim 21, wherein:
the means for determining that the first server is unavailable determines the first server is unavailable based on an error message received at the image processing device from the first server.

24. The system of claim 21, wherein:
the means for transmitting the identification information transmits identification information corresponding to the identity of the image processing device.

25. The system of claim 24, wherein:
the means for transmitting the identification information transmits a serial number of the image processing device.

26. The system of claim 21, wherein:
the means for transmitting the identification information transmits identification information corresponding to an identity of a user of the image processing device.

27. The system of claim 26, wherein:
the means for transmitting the identification information transmits a user name and password.

28. The system of claim 21, wherein:
the means for determining that the first server is unavailable determines that the first server is unavailable after identification information is transmitted from the image processing device to the first server.

29. The system of claim 21, wherein:
the means for determining the first server is unavailable determines that the first server is unavailable before transmitting identification information from the image processing device to the first server.

30. The system of claim 21, wherein:
the means for retrieving the information retrieves profile information corresponding to the image processing device.

31. The system of claim 30, wherein:
the means for retrieving the information retrieves the profile information which includes an identification of each of a plurality of network applications connected to the first and second servers.

32. The system of claim 30, further comprising:
means for storing identical profile information in each of the first and second servers.

33. The system of claim 21, wherein:
the means for retrieving the information retrieves at lest one executable file corresponding to each of a plurality of network applications identified in the information received from the second server.

34. The system of claim 21, further comprising:
means for storing information at each of the first and second server corresponding to each network application connected to the first and second servers.

35. The system of claim 21, further comprising:
means for storing an internet protocol address of the first server at the image processing device.

36. The system of claim 21, further comprising:
means for transmitting internet protocol address information of the first and second server to the image processing device each time the image processing device transmits information to the first server; and
means for storing the internet protocol address information for the first and second servers at the image processing device.

37. The system of claim 21, further comprising:
means for performing a user authentication operation at the second server when an image processing device determines that the first server is unavailable.

38. The system of claim 21, wherein:
the means for determining that the first server is unavailable determines that the first server is unavailable while transmitting job information to the first server.

39. The system of claim 38, further comprising:
means for transmitting the job information to a second server upon a detection that the first server is unavailable;
means for processing job information at the second server; and
means for transmitting processed job information from the second server to at least one of a plurality of network applications connected to the server.

40. The system of claim 39, wherein:
the means for transmitting processed job information includes transmitting the job information to a document management system.

41. A system of compensating for server unavailability in an image processing system, comprising:
an image processing device having an interface connected to a first server and a second server;
a processor, of the image processing device, configured to determine that a first server is unavailable;
the interface of the image processing device configured to transmit identification information to the second server when the processor determines that the first server is unavailable;
a module, at the second server, configured to retrieve information corresponding to the identification information;
an interface, at the second server, configured to transmit information corresponding to the identification information from the second server to the image processing device;
a memory configured to store license information in the first server;
a processor of the second server configured to activate license information in the second server upon determining that the first server is unavailable;
an interface of the first server configured to receive updated configuration data at the first server, wherein the configuration data includes security information, software plug-ins, and a list of network applications connected to the first server;
the interface of the second server configured to retrieve the updated configuration data from the first server; and
a memory, at the second server, configured to store the updated configuration data retrieved from the first server as configuration data.

42. The system of claim 41, wherein:
the processor, of the image processing device, determines that the first server is not available after the first server has not responded within a predetermined period of time.

43. The system of claim 41, wherein:
the processor of the image processing device is configured to determine that the first server is unavailable based on an error message received at the image processing device from the first server.

44. The system of claim 41, wherein:
the interface of the image processing device is configured to transmit identification information corresponding to the identity of the image processing device.

45. The system of claim 44, wherein:
the interface of the image processing device is configured to transmit a serial number of the image processing device.

46. The system of claim 41, wherein:
the interface of the image processing device is configured to transmit identification information corresponding to an identity of a user of the image processing device.

47. The system of claim 46, wherein:
the interface of the image processing device is configured to transmit a username and password.

48. The system of claim 41, wherein:
the processor of the image processing device is configured to determine that the first server is unavailable after transmitting identification information from the image processing device to the first server.

49. The system of claim 41, wherein:
the processor of the image processing device is configured to determine that the first server is unavailable before transmitting identification information from the image processing device to the first server.

50. The system of claim 41, wherein:
the module at the second server is configured to retrieve profile information corresponding to the image processing device.

51. The system of claim 50, wherein:
the module of the second server is configured to retrieve information which includes an identification of each of a plurality of network application connected to the first and second servers.

52. The system of claim 50, further comprising:
a first memory corresponding to the first server and a second memory corresponding to the second server configured to store identical profile information.

53. The system of claim 41, wherein:
the interface of the image processing device is configured to receive at least one executable file corresponding to each of a plurality of network applications identified in the information received from the second server.

54. The system of claim 41, further comprising:
a first memory at the first server and a second memory at the second server configured to store information corresponding to each network application connected to the first and second servers.

55. The system of claim 41, further comprising:

a memory configured to store an internet protocol address of the first server at the image processing device.

56. The system of claim 41, further comprising:

an interface of the first server configured to transmit internet protocol address information of the first and second server to the image processing device each time the image processing device transmits information to the first server; and a memory of the image processing device configured to store the IP address information for the first and second servers at the image processing device.

57. The system of claim 41, wherein:

the processor of the image processing device is configured to determine if the first server is unavailable while transmitting job information to the first server.

58. The system of claim 57, further comprising:

the interface of the image processing device configured to transmit the job information to a second server upon a detection that the first server is unavailable;

a processor at the second server configured to process the job information; and an interface of the second server configured to transmit process job information from the second server to at least one of a plurality of network applications connected to the second server.

59. The system of claim 58, wherein:

the interface of the second server is configured to receive job information related to a document processed by the image processing device; and the interface of the second server is configured to transmit processed job information to a document management system.

* * * * *